United States Patent [19]

Ayata et al.

[11] Patent Number: 4,476,486

[45] Date of Patent: Oct. 9, 1984

[54] IMAGE RECORDING SYSTEM UTILIZING A PLURALITY OF RECORDING UNITS

[75] Inventors: Naoki Ayata, Machida; Noboru Koumura, Narashino; Seiji Saito, Yokosuka; Hidetoshi Suzuki, Tokyo; Kunitaka Ozawa, Tokyo; Koji Kazuma, Tokyo, all of Japan

[73] Assignee: Canon Kabushiki Kaisha, Tokyo, Japan

[21] Appl. No.: 328,240

[22] Filed: Dec. 7, 1981

[30] Foreign Application Priority Data

| Dec. 16, 1980 | [JP] | Japan | 55-177654 |
| Dec. 16, 1980 | [JP] | Japan | 55-177655 |
| Dec. 16, 1980 | [JP] | Japan | 55-177656 |
| Dec. 16, 1980 | [JP] | Japan | 55-177657 |
| Dec. 16, 1980 | [JP] | Japan | 55-177658 |
| Dec. 16, 1980 | [JP] | Japan | 55-177659 |
| Dec. 23, 1980 | [JP] | Japan | 55-183128 |
| Dec. 27, 1980 | [JP] | Japan | 55-186525 |
| Dec. 27, 1980 | [JP] | Japan | 55-186526 |

[51] Int. Cl.$^3$ ............................................. H04N 1/22
[52] U.S. Cl. ........................................ 358/78; 358/75
[58] Field of Search ................ 358/75, 256, 285, 296, 358/300, 302, 258, 78; 355/24, 26, 46, 4, 3 R

[56] References Cited

U.S. PATENT DOCUMENTS 3,588,322 6/1971 Bartel et al. ........................... 358/75
4,251,153 2/1981 Levine ................................... 358/300

Primary Examiner—Michael A. Masinick
Attorney, Agent, or Firm—Fitzpatrick, Cella, Harper & Scinto

[57] ABSTRACT

An image recording apparatus of the invention has a number of recording units for recording image data of the same or different colors on one or more recording media; a counter to set the number of copies to be produced; and a switch device which selects the recording units to be used in a current recording operation according to the number of copies to be produced and statuses of the respective recording units. A number of copies can be produced simultaneously by the recording units within a period of time shorter than a period of time required for sequentially recording the same number of copies. Dichromatic or polychromatic recording may be freely selected or combined with monochromatic recording by selecting feed paths and an auxiliary path for guiding the recording paper sheet.

40 Claims, 27 Drawing Figures

| MODE SWITCH | DATA SELECTOR ||
| :---: | :---: | :---: |
| | DS1B | DS1R |
| M 11 | B | R |
| M 12 | B + R | / |
| M 13 | B | / |
| M 14 | / | B + R |
| M 15 | / | R |
| M 16 | R | B |
| M 17 | / | B |
| M 18 | R | / |

FIG. 18

| MODE SWITCH | DS2(DS3) |
| :---: | :---: |
| M21 (M31) | B + R |
| M22 (M32) | B |
| M23 (M33) | R |

FIG. 19

IMAGE RECORDING SYSTEM UTILIZING A PLURALITY OF RECORDING UNITS

BACKGROUND OF THE INVENTION

1. Field of the Invention

The present invention relates to a recording apparatus which has a plurality of recording units.

2. Description of the Prior Art

As recording apparatuses, photocopying machines utilizing the electrophotographic technique, inkjet recording apparatuses and so on are conventionally known. With these recording apparatuses, in order to obtain a plurality of hard copies from a single original or single piece of data, the recording process must be performed for a number of times equal to the number of hard copies desired. Consequently, in order to obtain a desired number of copies, time is required which equals the product of the time required for one recording operation and the number of copies desired.

In order to record different images on separate recording media, a plurality of recording operations are also necessary.

A plurality of recording operations are also required to obtain a dichromatic or polychromatic recorded image with a recording apparatus which utilizes the electrophotographic technique.

When a plurality of pieces of data are simultaneously available, the conventional recording apparatus can only time-serially record these pieces of data.

A recording apparatus necessarily is bulky if is to perform dichromatic or polychromatic recording. Particularly when, for example, sales slips are operated on it is necessary to record in different colors on different recording media.

SUMMARY OF THE INVENTION

It is an object of the present invention to provide a recording apparatus which alleviates the drawbacks of the prior art recording apparatuses. More specifically, it is an object of the present invention to provide a recording apparatus which has a plurality of recording units so that the recording time for producing a plurality of copies may be significantly reduced.

It is another object of the present invention to provide a recording apparatus which is capable of selecting a recording unit among a plurality of recording units based on the status of each of these recording units, such status being the remaining amount of the recording medium in the recording sheet feed unit, jamming of the recording sheet feed system, exhaustion of ink in the case of inkjet recording, or the like.

It is another object of the present invention to provide a recording apparatus having a plurality of recording units in order to produce a plurality of copies at one time independently of whether there is only one or more pieces of recording data.

It is still another object of the present invention to provide a recording apparatus having a plurality of recording units wherein colors produced by at least two recording units are different from each other.

It is still another object of the present invention to provide a recording apparatus having a plurality of recording units wherein at least one recording unit has a recording means which is capable of recording in two or more colors.

It is still another object of the present invention to provide a recording apparatus which is capable of simultaneously recording different pieces of data on separate recording media and which is also capable of recording different pieces of image data on a single recording medium.

It is still another object of the present invention to provide a recording apparatus which has a plurality of recording units for recording in different colors so that monochromatic recording is performed when only one recording unit is used and dichromatic or polychromatic recording is performed by simply switching the feed path of the recording medium.

It is still another object of the present invention to provide a recording apparatus which reads an image of an original by color separation and which is capable of recording in a plurality of colors according to the readout signals.

The above and other objects and features of the present invention will become more apparent from the following detailed description when taken in conjunction with the accompanying drawings.

BRIEF DESCRIPTION OF THE DRAWINGS

FIG. 18 is a table showing the mode switches of a unit 1 and the data selectors;

FIG. 19 is a table showing the mode switches of units 2 and 3 and the data selectors;

DETAILED DESCRIPTION OF THE PREFERRED EMBODIMENTS

The preferred embodiments of the present invention will now be described with reference to the accompanying drawings.

Figure 1:
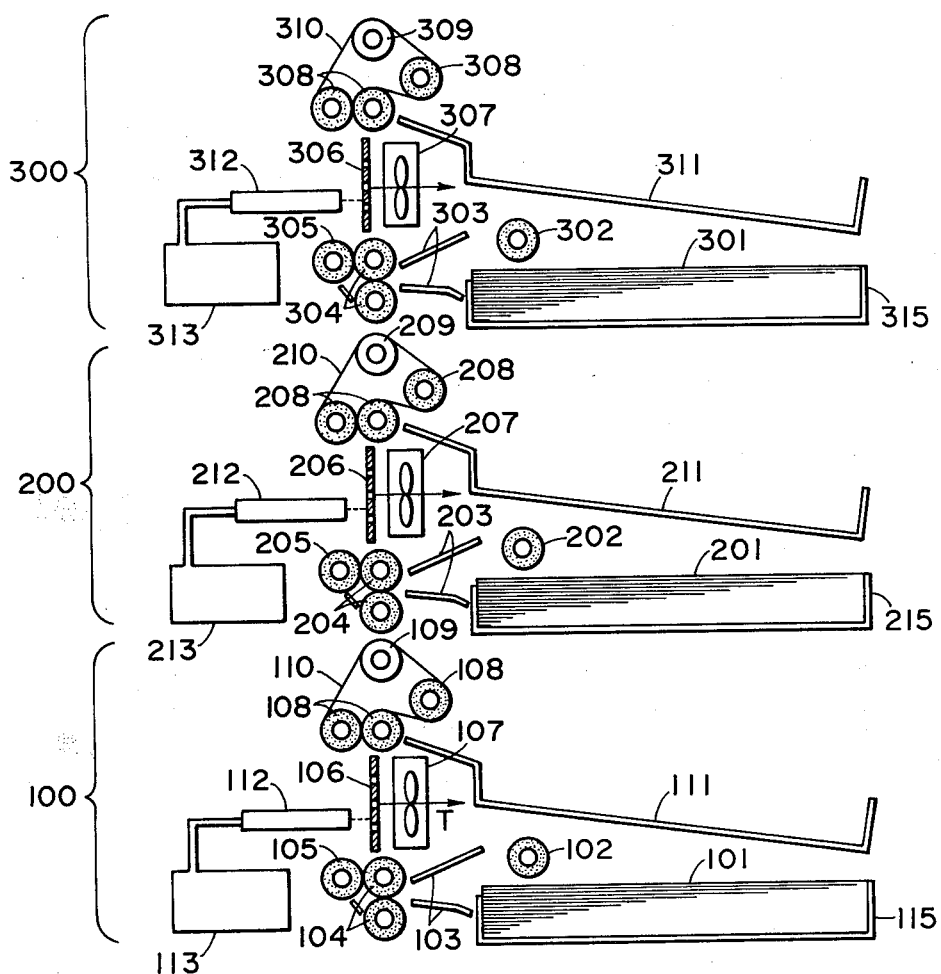
FIG. 1 is a schematic sectional view of a recording apparatus according to the first embodiment of the present invention.

FIG. 1 is a schematic sectional view showing a recording apparatus according to the first embodiment of the present invention. Referring to FIG. 1, the recording apparatus has recording units 100, 200 and 300 of the same configuration, which are vertically aligned by supports (not shown).

Referring to FIG. 1, recording paper sheets 101, 201 and 301 are housed in recording paper sheet cassettes 115, 215 and 315. The recording paper sheets 101, 201 and 301 are respectively fed through pickup rollers 102, 202 and 302; guide plates 103, 203 and 303; register rollers 104, 204 and 304; and first feed rollers 105, 205 and 305. Platens 106, 206 and 306 respectively have a number of small holes. Fans 107, 207 and 307 are disposed above the guide plates 103, 203 and 303, respectively, and second feed rollers 108, 208 and 308 are disposed thereabove. Suspension rollers 109, 209 and 309 are disposed above the second feed rollers 108, 208 and 308. Feed belts 110, 210 and 310 are reeved about the second feed rollers 108, 208 and 308. Ink is supplied to inkjet recording heads 112, 212 and 312 from ink tanks 113, 213 and 313. The recorded sheets are output to exhaust trays 111, 211 and 311.

The recording operation of the recording apparatus of the above construction will now be described. Since the recording units 100, 200 and 300 all operate in the same manner, the description will be made only of the recording unit 100.

The recording paper sheet 101 housed in the recording paper sheet cassette 115 is fed to the stationary register rollers 104 upon rotation of the pickup roller 102 to form a loop. Upon the rotation of the register rollers 104, the recording paper sheet 101 is clamped between one register roller 104 and the first feed roller 105 and is fed toward the inkjet head 112.

The platen 106 with small holes and the fan 107 are disposed in opposition to the inkjet head 112. A flow of air is supplied in the direction indicated by arrow T upon the rotation of the fan 107.

After passing over the first feed roller 105, the recording paper sheet is drawn by the fan 107 toward the second feed rollers 108 while fed over the platen 106.

Since the recording paper sheet is fed as drawn by the platen 106, the recording paper sheet is kept flat. The inkjet head 112 is a full line inkjet head in which a plurality of recording elements are vertically aligned in a length substantially corresponding to the width of the recording paper sheet. The inkjet head 112 is driven by electric signals from a source (not shown) for recording.

When the leading end of the recording paper sheet is fed to the second feed roller 108 after recording, the recording paper sheet is exhausted to the exhaust tray 111 by the second feed roller 108 and the feed belt 110.

Figure 2:
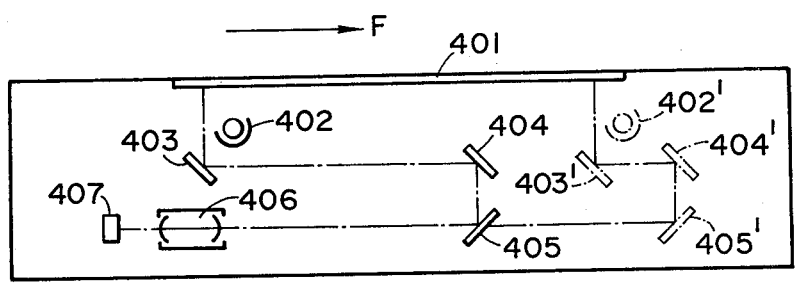
FIG. 2 is a schematic view of an input unit which is used in the present invention.

FIG. 2 is a schematic view of an original readout device at an input section of the recording apparatus of the present invention.

Below an original glass table 401 are disposed halogen lamps 402 or rod-shaped light sources such as fluorescent lamps, a first mirror 403, a second mirror 404, a third mirror 405, a lens 406, and a one-dimensional solid pickup element 407 such as a CCD.

The mode of operation of the original readout device will now be described. The original placed on the original glass table 401 is illuminated by the rod-shaped light sources 402. An image of the original is formed on the CCD 407 by the lens 406 through a scanning (subscanning) system consisting of the first mirror 403, the second mirror 404 and the third mirror 405. The direction of the main scanning by the CCD 407 is the direction perpendicular to the plane of the figure.

The rod-shaped light sources 402 and the first mirror 403 are integrally connected on a support (not shown) and are displaced on guide rails (not shown) in the direction shown by arrow F for scanning (subscanning) the original. The second mirror 404 and the third mirror 405 are integrally connected on a support (not shown) and are displaced on guide rails (not shown) in the same direction as the displacement of the first mirror 403 at a speed ½ the speed of the displacement of the first mirror 403. The rod-shaped light sources 402, the first mirror 403, the second mirror 404, and the third mirror 405 are displaced to positions (402', 403', 404' and 405') indicated by dotted lines. The length of the optical path from the original glass table 401 through the mirrors 403, 404 and 405 to the lens 406 is kept constant.

Therefore, if the signals from the light-receiving elements of the CCD 407 are read out sequentially during subscanning, raster scanning signals of the entire area of the original may be sequentially obtained.

Figure 3:
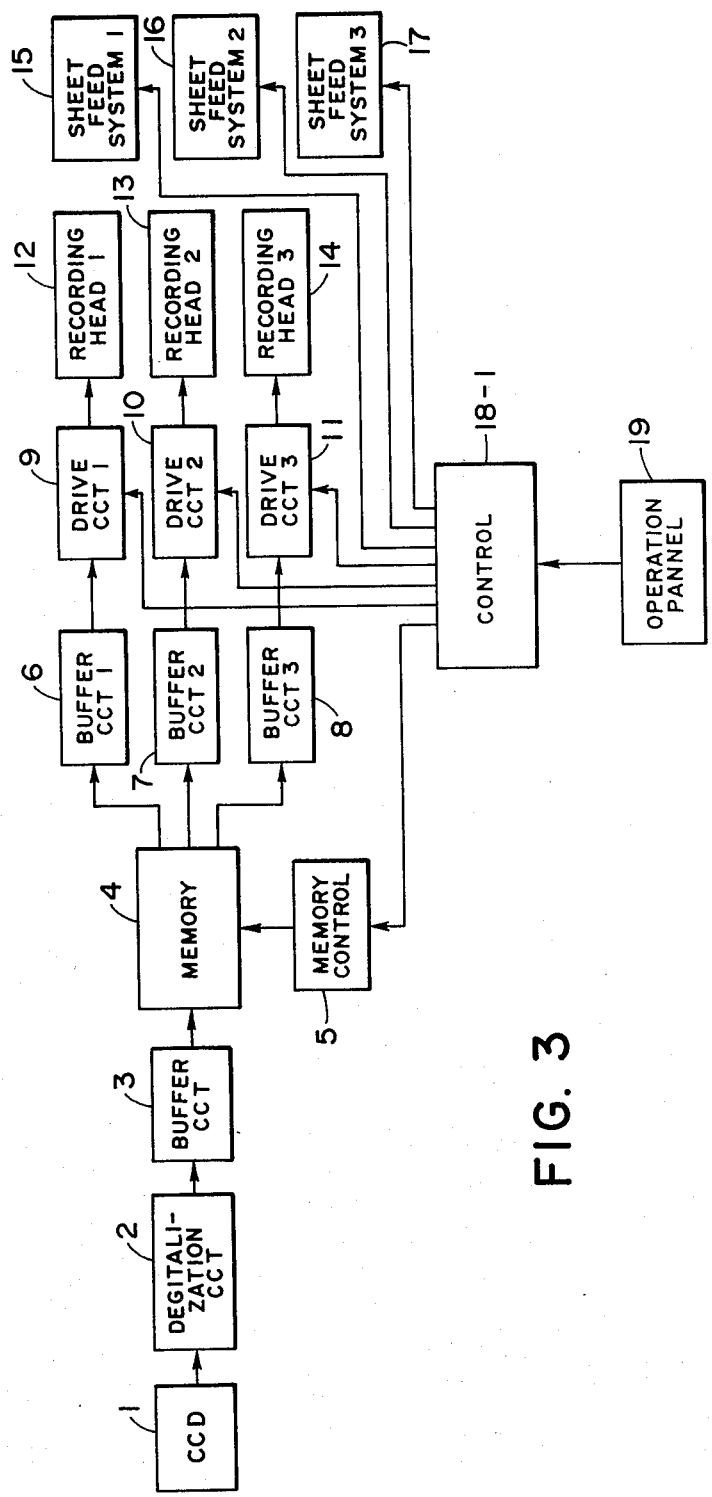
FIG. 3 is a block diagram of the circuitry for the apparatus shown in FIGS. 1 and 2.

FIG. 3 is a block diagram of the circuitry of the apparatus shown in FIGS. 1 and 2.

Referring to FIG. 3, a CCD circuit 1 corresponds to the CCD 407 in FIG. 2. A digitalization circuit 2 and a buffer circuit 3 are serially connected to the CCD circuit 1 in the order named. A memory 4 connected to the buffer circuit 3 is capable of writing and reading out data. A memory control 5 controls the operation of the memory 4. A first buffer circuit 6, a second buffer circuit 7 and a third buffer circuit 8 are connected to respective outputs of the memory 4. A first drive circuit 9, a second drive circuit 10 and a third drive circuit 11 are connected to the output ends of the first to third buffer circuits 6 to 8. A first recording head 12 corresponds to the inkjet head 112 in FIG. 1. A second recording head 13 corresponds to the inkjet head 212 in FIG. 1. A third recording head 14 corresponds to the inkjet head 312 in FIG. 1. A sheet feed system 15 is for the first recording unit (100 in FIG. 1). A sheet feed system 16 is for a second recording unit (200 in FIG. 1). A sheet feed system 17 is for a third recording system (300 in FIG. 1). A control 18-1 controls the overall circuitry and related mechanisms. An operation panel 19 has a dial for setting the recording number, a start button for initiating recording and so on.

The operation of the circuitry shown in FIG. 3 will now be described. Data on the image read out by the CCD circuit 1 is binary-coded or coded based on any desired base by the digitalization circuit 2. For the sake of simplicity, the following description will be made in the case of binary encoding.

The binary-coded data is stored in the memory 4 which comprises, for example, a RAM (random access memory) through the buffer circuit 3. The capacity of the memory 4 may be arbitrarily selected from a small capacity of a line memory or the like to a large capacity of a page memory or the like. Depending on the capacity of the memory 4 selected, the data of an original may be recorded as the readout operation is performed, or data of an original of one page or several pages may be read out and stored in the memory once and then may be recorded.

An address signal, a timing signal, and a read/write signal for writing in or reading out of data from the memory 4 are output from the memory control 5 which is, in turn, controlled by the control 18-1. The image data stored in the memory 4 is output to the buffer circuits 6, 7 and 8 under the control of the memory control 5. The data in the buffer circuits 6, 7 and 8 is recorded when the recording heads 12, 13 and 14 are biased by the drive circuits 9, 10 and 11. The driving operation of the drive circuits 9, 10 and 11 is controlled by the control 18-1, so that the recording heads 12, 13 and 14 are selected as needed.

The control 18-1 also controls the sheet feed systems 15, 16 and 17 consisting of the supply rollers 102, 202 and 302; the register rollers 104, 204 and 304; the first feed rollers 105, 205 and 305; and the second feed rollers 108, 208 and 308.

The driving power is supplied to these rollers through belts (not shown) and clutches (not shown) from a single power source (not shown). Alternatively, stepping motors or the like may be directly connected to the individual rollers. The control 18-1 time-serially turns on and off these rollers to perform the feeding operation of the recording paper sheet as described with reference to FIG. 1. As in the case of the recording heads, the control 18-1 can selectively operate the sheet feed systems 15 (corresponding to the recording unit 100), 16 (corresponding to the recording unit 200), and 17 (corresponding to the recording unit 300). It is thus possible to perform the sheet feeding operation for one selected recording unit only.

Figure 4:
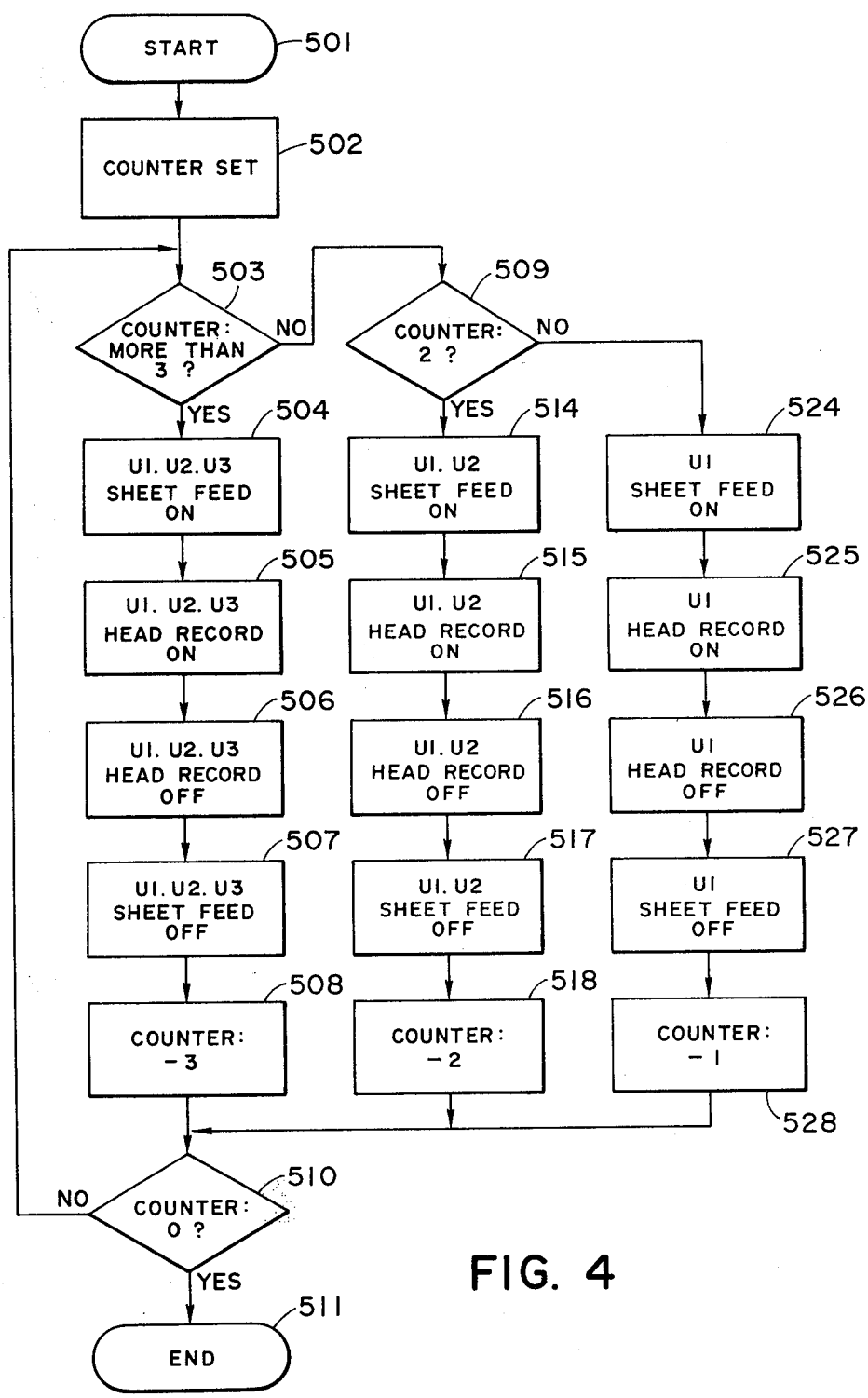
FIG. 4 is a flow chart showing the process for producing a plurality of copies by the recording apparatus of the present invention.

FIG. 4 is a flow chart for selecting and recording with a plurality of recording units in the recording apparatus.

In the example shown in FIG. 4, the recording units have a predetermined priority; a first recording unit U1 has the first priority, a second recording unit U2 has the second priority, and a third recording unit U3 has the third priority.

When recording is initiated (step 501), the recording number specified by the operation panel 19 in FIG. 3 is set in the recording number counter in the control 18-1 (step 502).

It is discriminated whether the number set in the recording number counter is 3 or more (step 503). If it is 3 or more, the sheet feed systems of the first, second and third recording units are turned on (step 504), and the first, second and third recording units start recording (step 505). After a predetermined recording operation is complete, the heads are turned off (step 506). If the recording paper sheets are output to the exhaust trays (111, 211 and 311 in FIG. 1), the sheet feed systems are also turned off (step 507). If the number set in the recording number counter is 2 or less (step 508), it is determined if it is 2 or 1 (step 509). If it is 2, the first and second recording units perform recording (steps 514 to 517). If it is 1, the first recording unit performs recording (steps 524 and 527).

After the sheet feed systems are turned off, the recorded number of sheets is subtracted from the number set in the recording number counter, 3 if the first to third recording units performed recording, 2 if the first and second recording units performed recording, and 1 if the first recording unit only performed recording (steps 508, 509 and 510). It is discriminated if the content of the counter is zero (step 510). If the content of the counter is zero, the recording operation is terminated (step 511). If the content of the counter is not zero, the flow returns to the loop for checking if the content of the counter is 3 or more, and the recording operation is performed until the content of the counter is zero.

By the control operation as described above, a desired number of copies set by the operation panel 19 may be obtained.

Since three recording units are used in this embodiment, two copies may be obtained at a speed twice the conventional speed. Three copies may be obtained at a speed three times the conventional speed. If the desired number of copies is 4 or more, the recording time is also reduced significantly. Although three recording units are used in this embodiment, two, four or more recording units may be used.

Figure 5:
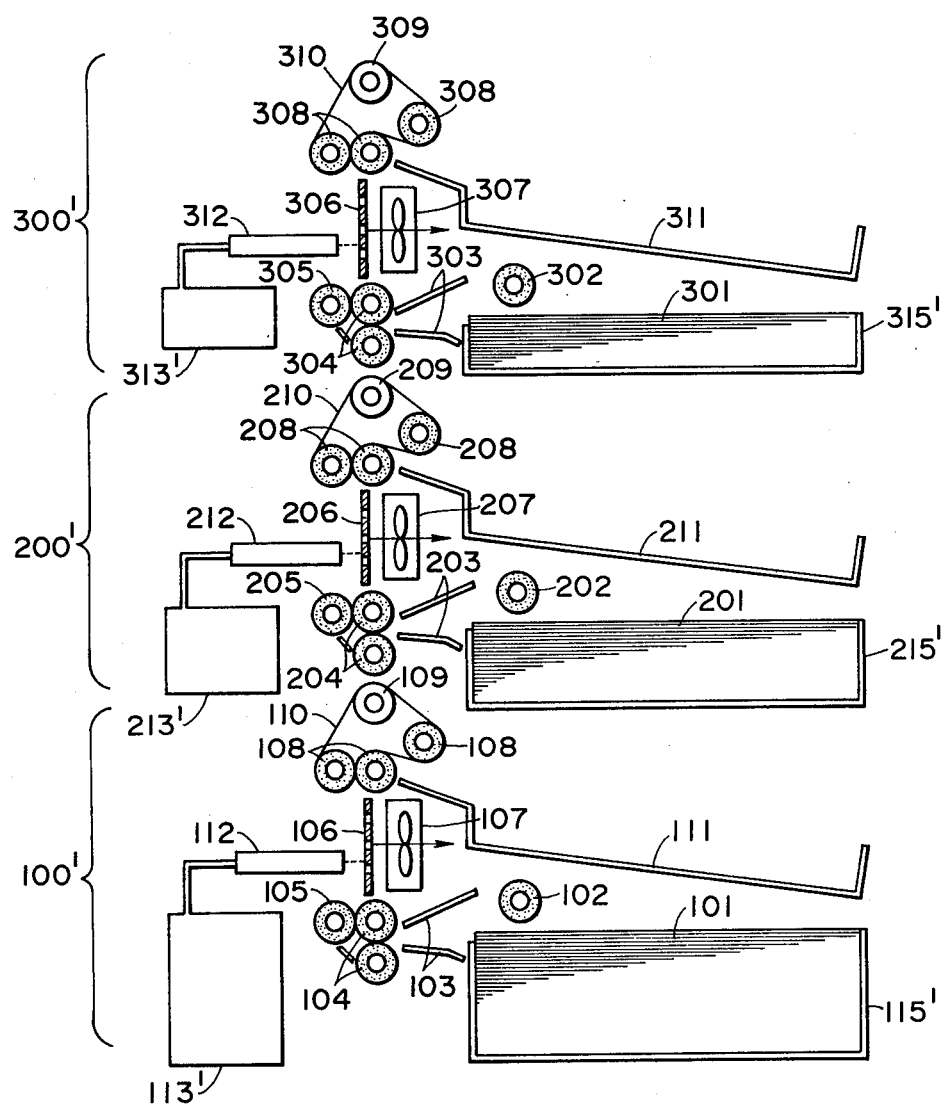
FIG. 5 is a schematic sectional view of a recording apparatus according to the second embodiment of the present invention.

The second embodiment of the present invention is shown in FIG. 5.

Referring to FIG. 5, similar parts as in FIG. 1 are denoted by the same numbers. The recording apparatus shown in FIG. 5 is controlled by the control shown in FIG. 3 according to the control flow chart shown in FIG. 4. According to the control flow chart shown in FIG. 4, the first recording unit, the second recording unit and the third recording unit have the priority in the order named. Therefore, referring to FIG. 1, the recording paper sheets in the first recording paper sheet cassette 115 are exhausted more rapidly than those in the second and third recording paper sheet cassettes 215 and 315. The same applies to the ink tanks 113, 213 and 313.

In consideration of this, in this embodiment, the capacity for recording paper sheets is large, medium, and small, respectively, in the case of a first recording paper sheet cassette 115', a second recording paper sheet cassette 215', and a third recording paper sheet cassette 315'.

With this construction, the recording paper sheets and ink need not be supplemented frequently even if they are consumed faster at the first recording unit.

Accordingly, the recording apparatus of the present invention has a plurality of recording units which simultaneously record on a plurality of recording members, a means for setting a number of recording paper sheets to be recorded, and a recording unit selecting means for selecting the recording units to simultaneously perform recording among the plurality of recording units according to the recording number. Therefore, a plurality of recorded copies may be obtained within a short period of time.

Since the recording units have priority when $M>N$ (where the set recording number is N and the number of the recording units incorporated is M ($M \geq 2$)), the user need not select the recording units to use so that the apparatus is easily operable.

The recording apparatus of the present invention has M recording units ($M \geq 2$) which simultaneously record on recording paper sheets, recording paper sheet cassettes which are incorporated in the number corresponding to that of the recording units and which house the recording paper sheets, and a means for setting the recording number N. The recording units have the priority of the recording units to be used when N is smaller than M. Since the capacities of the recording paper sheet cassettes are set according to the priority of the corresponding recording units, the recording paper sheets in the cassette corresponding to the recording unit of higher priority need not be frequently supplemented, resulting in convenience.

The recording apparatus according to the second embodiment of the present invention will now be described which has a processing function to implement a countermeasure when one or more recording units are unable to continue recording due to the absence of recording paper sheets in the cassette or ink in the ink tank.

Figure 6:
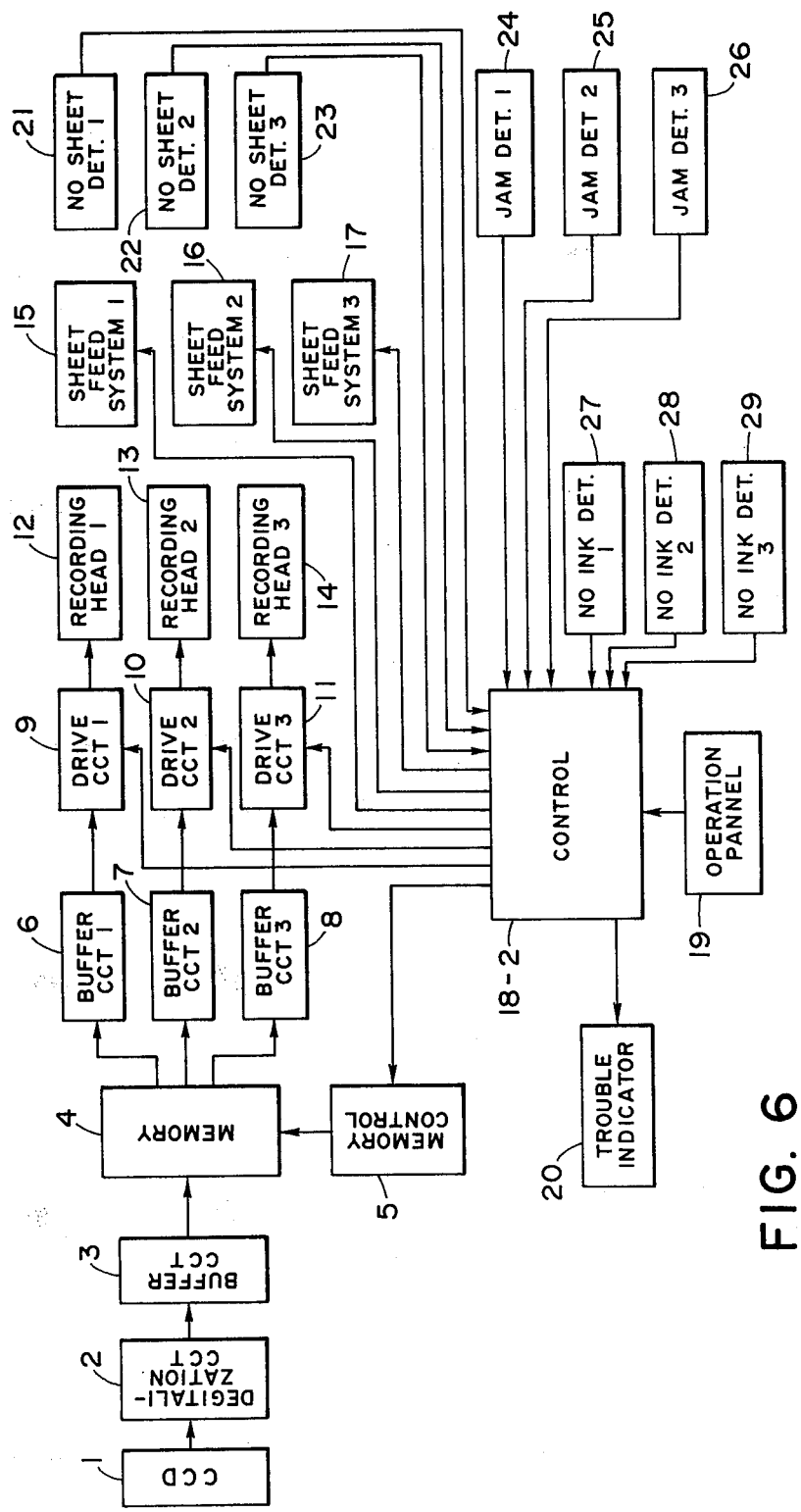
FIG. 6 is a block diagram of the circuitry of the recording apparatus shown in FIG. 5.

FIG. 6 is a block diagram of a control of the recording apparatus which has the processing function as described above.

Referring to FIG. 6, similar parts of the same operations of functions as in FIG. 3 are denoted by the same numbers and the description thereof will be omitted.

A control 18-2 controls the memory control 5, the drive circuits 9, 10 and 11, and the sheet feed systems 15, 16 and 17, and also receives trouble signals.

No sheet detectors 21, 22 and 23 as trouble detectors are incorporated for the respective recording paper sheet cassettes 115, 215 and 315 of the respective recording units. Jam detectors 24, 25 and 26 for detecting jamming of the sheets are incorporated for the sheet feed systems 15, 16 and 17. No ink detectors 27, 28 and 29 for detecting the absence of ink are incorporated for the ink tanks 113, 213 and 313. The trouble signals from these trouble detectors are input to the control 18-2. In response to the trouble signal, the control 18-2 indicates at a trouble indicator 20 the kind and location of the trouble.

Figure 7:
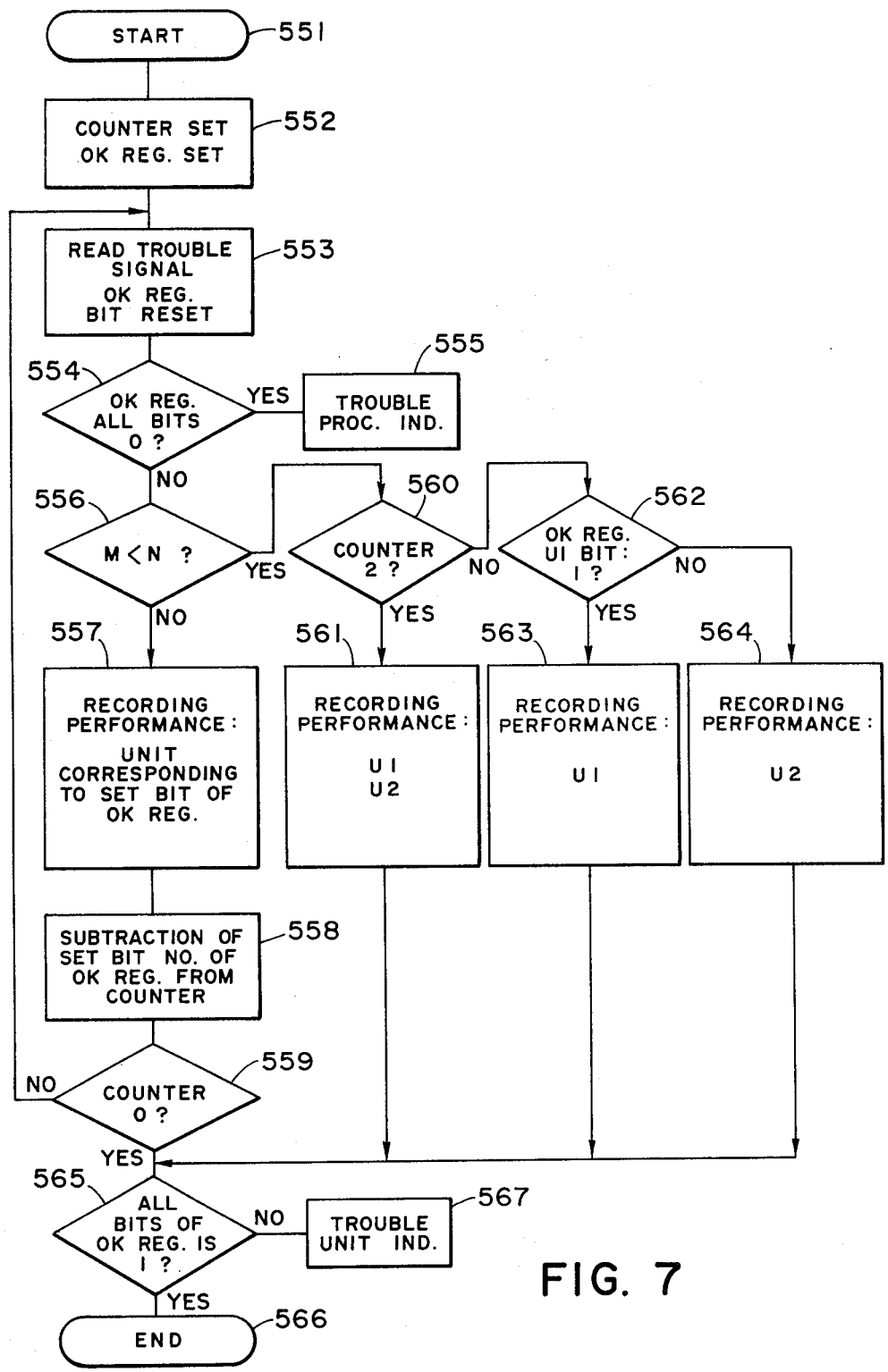
FIG. 7 is a control flow chart of the circuitry shown in FIG. 6.

FIG. 7 is a schematic flow chart of the control operation of the control 18-2 shown in FIG. 6. The description will now be made according to the flow chart shown in FIG. 7.

When recording is initiated (step 551), the recording number set by the dial (not shown) on the operation panel 19 is set in the recording number counter by a control 18′. All the bits of OK registers for the respective recording units are set to (1) (step 552). When the bits of the OK register are under the set condition (1), the corresponding recording unit can be used. If the bits of the OK register are under the reset condition (0), the corresponding recording unit cannot be used.

The trouble signals from the no sheet detectors 21, 22 and 23, the jam detectors 24, 25 and 26, and the no ink detectors 27, 28 and 29 are read in the control 18-2, and the bits of the OK registers of the recording units involved in the trouble are reset (step 553).

It is then determined whether the bits of the OK registers are all reset (0) (step 554). If they are all reset, all the recording units are involved in the trouble and the trouble indicator 20 indicates the trouble processing step (step 555). If at least one recording unit is normal, the recording number N of the recording number counter is compared with the set bit number (corresponding to M) of the OK register (the number of the recording units which are not involved in the trouble). If the recording number is smaller than the set bit number (step 556), the flow advances to step 560. If not, the flow advances to step 557. The recording unit which performs recording in step 557 is the recording unit in which the bits of the corresponding OK register are set. When the recording is completed, the set bit number of the OK register is subtracted from the recording number (step 558). It is then checked if the recording number is zero (step 559). If the recording number is zero, the flow advances to step 565. If not, the flow returns to step 553.

The flow chart advances from step 556 to step 560 in the following three cases:

(1) All the bits of the OK registers of the three recording units are set, and the recording number is 2.

(2) All the bits of the OK registers of the three recording units are set, and the recording number is 1.

(3) All the bits of the OK registers of the two recording units are set, and the recording number is 0.

When the recording number is 2, all the recording units are normal and may be selected. Therefore, the recording units U1 and U2 of higher priority perform the recording (step 561).

If the recording number is 1, it is checked in step 562 if the bits of the OK register of the recording unit U1 are set. If the recording unit U1 can be used, the recording unit U1 performs the recording (step 563). If the recording unit U1 is involved in the trouble, the remaining two recording units U2 and U3 are not involved in the trouble. Therefore, the recording unit U2 performs recording (step 564). The recording for the number of sheets corresponding to the recording number set in the recording number counter is thus completed. Finally, the bits of the OK register are checked (step 565), and the trouble condition of the recording unit is indicated by the indicator 20 (step 567).

In this manner, the recording units which are not involved in the trouble can perform recording.

The recording apparatus of the present invention has a plurality of recording units for recording on a plurality of recording members, a setting means for setting a recording number, a detecting means for detecting if the respective recording units are in the usable or unusable condition, and a selecting means for selecting the recording unit to be used according to the set recording number and the output from said detecting means. Therefore, the recording apparatus of the present invention can produce a plurality of recorded copies quickly. Even if there is an unusable recording unit, the desired number of recorded copies may be produced by the usable recording units.

The recording apparatus according to the third embodiment will now be described which also selects the appropriate recording unit according to the amount of the remaining recording paper sheets held in the recording paper sheet cassettes for a plurality of recording units.

Figure 8:
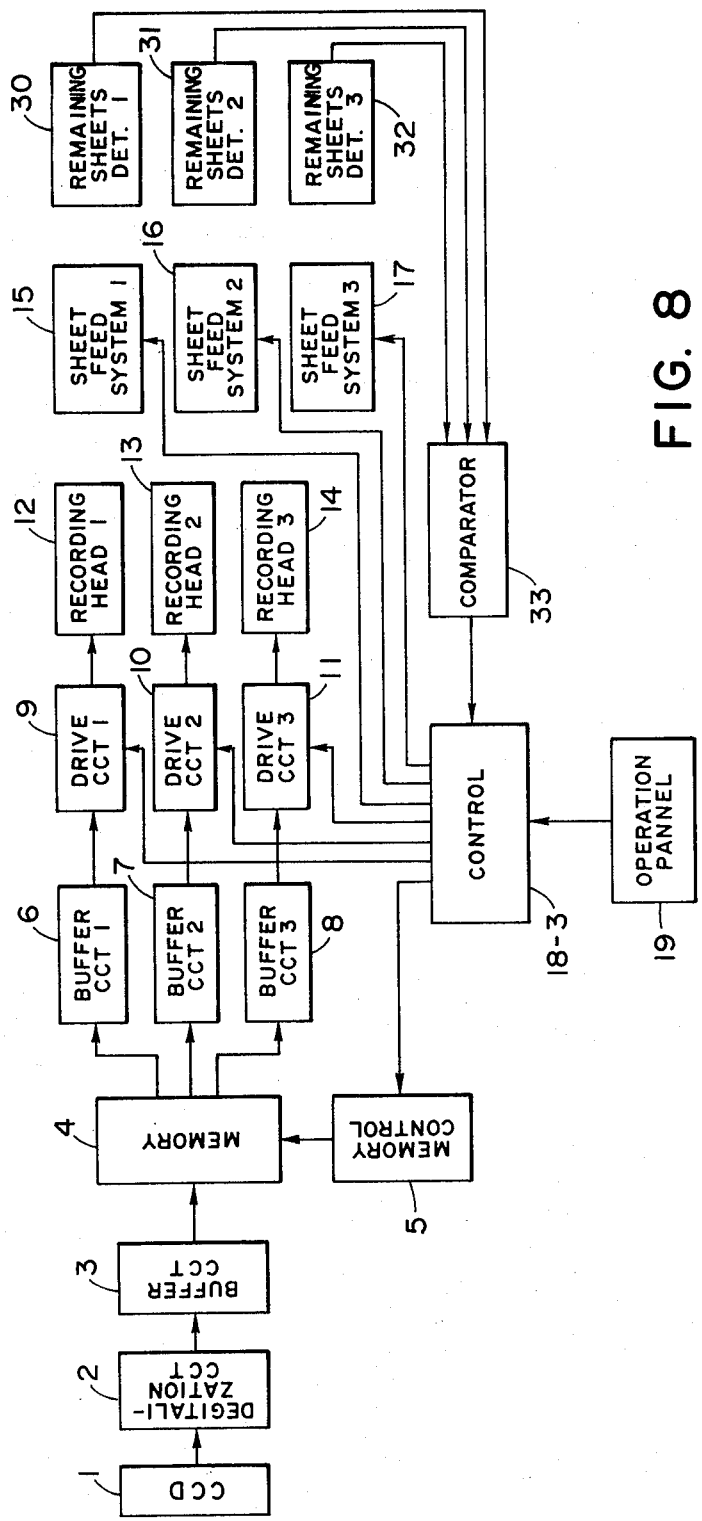
FIG. 8 is a block diagram of a recording apparatus according to the third embodiment of the present invention.

FIG. 8 is a block diagram of a control of the recording apparatus which has the recording unit selection function as described above.

Referring to FIG. 8, similar parts of the same operations or functions as in FIG. 3 are denoted by the same reference numerals and the description thereof will be omitted.

A control 18-3 controls the memory control 5, the drive circuits 9, 10 and 11, and the sheet feed systems 15, 16 and 17. The control 18-3 also receives a comparison output from a comparator 33 which compares detection signals from remaining sheet detectors 30, 31 and 32 which detect amounts of remaining recording paper sheets in recording paper sheet cassettes. The detection of the remaining amount of the recording paper sheets is performed by a remaining sheet detector as shown in FIG. 9.

Figure 9:
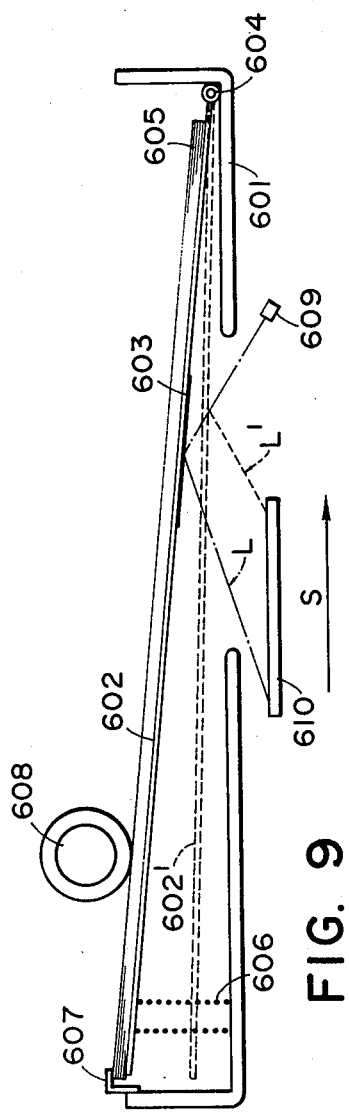
FIG. 9 is a schematic sectional view of a device for detecting the remaining amount of the recording paper sheets in a cassette.

The detector shown in FIG. 9 has a cassette main body 601, an intermediate plate 602, a reflecting plate 603 of a metal or the like which is mounted to the intermediate plate 602, a pivot point 604 of the intermediate plate 602, which supports recording paper sheets 605, a spring 606 for the intermediate plate 602, a separation pawl 607, a pickup roller 608, a light-emitting element 609, and a one-dimensional CCD 610.

The mode of operation of the device shown in FIG. 9 will now be described. According to the remaining amount of the recording paper sheets 605, the intermediate plate 602 vertically moves within the cassette about the pivot point 604 by the biasing force of the spring 606. More specifically, when the amount of the recording paper sheets remaining in the cassette is small, the intermediate plate 602 is located at the position indicated by the solid line. On the other hand, when the amount of the recording paper sheets remaining in the cassette is greater, the intermediate plate 602 is located at a position indicated by dotted lines at 602'. The position of the intermediate plate 602 is detected by the light-emitting element 609 and the one-dimensional CCD 610 which are disposed outside the cassette.

The light-emitting element 609 may comprise a light-emitting diode (LED). The one-dimensional CCD 610 may comprise a linear image sensor CCD in which the direction of main scanning is in the direction indicated by arrow S. Light emitted from the light-emitting element 609 passes through a window formed in the cassette main body 601, is reflected by the reflecting plate 603 backing the rear surface of the intermediate plate 602, and becomes incident on the CCD 610. If the intermediate plate 610 is at the upper position under this condition, the light becomes incident on the CCD through an optical path L shown in FIG. 9. On the other hand, if the intermediate plate is at the position indicated by the dotted line 602', the light becomes incident on the CCD 610 through an optical path L'. Therefore, the remaining amount of the recording paper sheets may be detected by detecting the bit number at the bright level of the output from the CCD 610.

Figure 10:
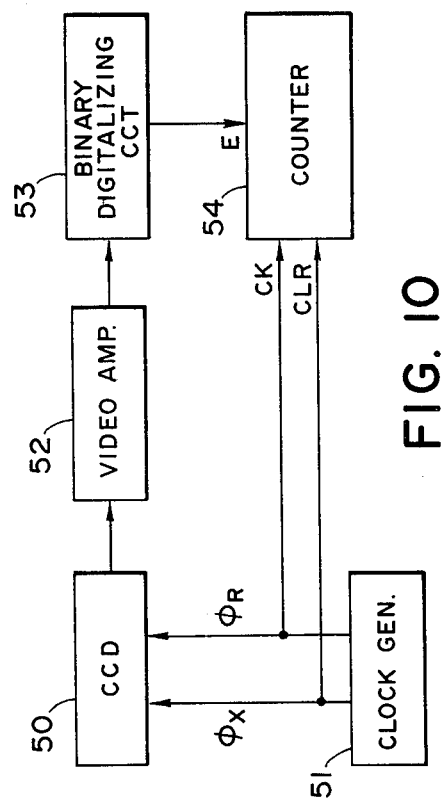
FIG. 10 is a block diagram of a remaining sheet detector.

FIG. 10 is a schematic block diagram of the circuitry for detecting the remaining amount of recording paper sheets with the device shown in FIG. 9. A one-dimensional CCD 50 corresponds to the CCD 610 shown in FIG. 9. Output ends of a clock generator 51 are connected to the input ends of the CCD 50. A video amplifier 52 is connected to the output end of the CCD 51. A binary digitalizing circuit 53 is connected to the output end of the video amplifier 52. A counter 54 receives the output from the binary digitalizing circuit 53.

The output ends of the clock generator 51 are also connected to the counter 54.

The clock generator 51 supplies to the CCD 50 drive clocks such as a reset clock $\phi R$ of the amplification of the output from the CCD 50, a start pulse $\phi X$ for controlling the accumulating time of the CCD, and so on. The reset clock $\phi R$ is of the same frequency as the video signal which is the picture element output from the CCD. The start pulse $\phi X$ is of the same duration as the scanning duration of one scanning line. The video signal output from the CCD 50 is amplified by the video amplifier 52 and is then digitalized by the binary digitalizing circuit 53.

The reset clock $\phi R$ is input to the clock input CK of the counter 54, and the start pulse $\phi X$ is supplied to the clear input CLR of the counter 54. The output from the binary digitalizing circuit 53 is of low level when the output from the CCD 50 is at bright level, and is of high level when the output from the CCD 50 is at dark level. The output end of the binary digitalizing circuit 53 is connected to the enable input end E of the counter 54.

When the CCD 50 starts scanning, the counter 54 counts the bit number of the output from the CCD 50 until the CCD 50 senses the bright level.

By reading the output from the counter 54 in this manner, the bit location at the bright level may be detected and the remaining amount of recording paper sheets may thus be detected.

With the remaining sheet detecting device described above, the exact number of remaining recording paper sheets may not be detected. However, the amounts of the remaining recording paper sheets in the three cassettes may be compared.

The method for detecting the remaining amount of recording paper sheets in the cassette and for selecting the recording units with the remaining sheet detector shown in FIG. 9 will further be described with reference to FIG. 8.

Parts denoted by reference numerals 1 through 19 in FIG. 8 are the same as those in FIG. 3. The first remaining sheet detector 30 corresponds to the first recording unit U1. The second remaining sheet detector 31 corresponds to the second recording unit U2. The third remaining sheet detector 32 corresponds to the third recording unit U3. The output ends of these remaining sheet detectors are connected to the comparator 33 which compares the detection outputs therefrom and supplies a comparison output to the control 18-3.

Figure 11:
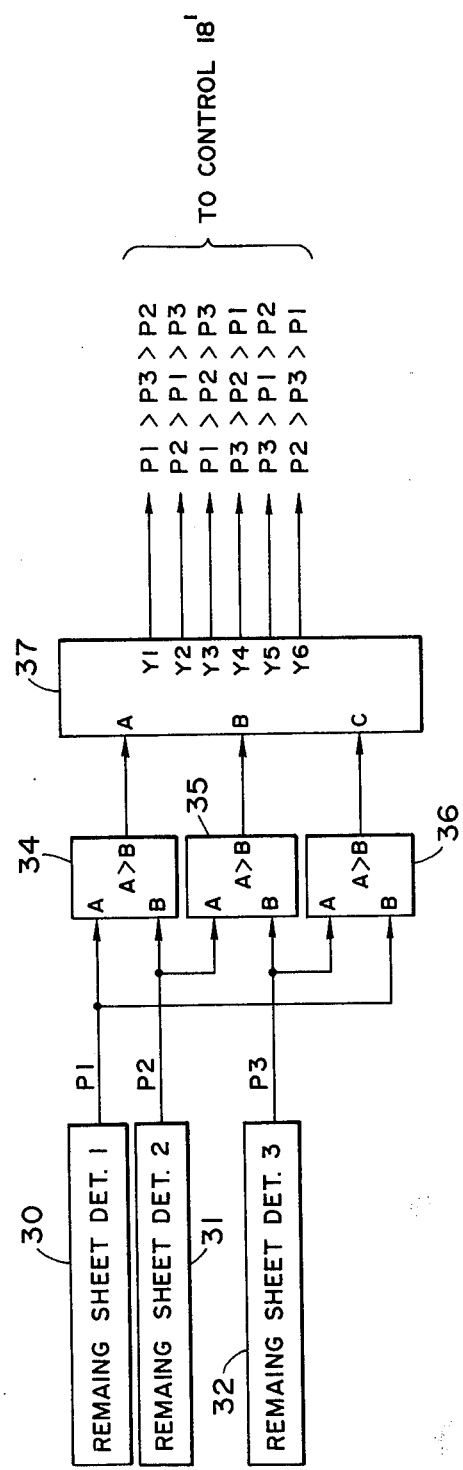
FIG. 11 is a block diagram of a remaining sheet comparator.

FIG. 11 shows an example of the comparator 33 which incorporates comparators 34, 35 and 36, and an 8-line decoder 37 having three input ends.

The digital comparators 34, 35 and 36 are 8-bit comparators if the CCD sensors (610 in FIG. 9) of the remaining sheet detectors 30, 31 and 32 are 256-bit line sensors. The comparator 34 compares an output P1 (A input) from the remaining sheet detector 30 with an output P2 (B input) from the remaining sheet detector 31. The comparator 35 compares the output P2 (A input) from the remaining sheet detector 31 with an output P3 (B input) from the remaining sheet detector 32. The comparator 36 compares the output P3 (A input) from the remaining sheet detector 32 with the output P1 (B input) of the remaining sheet detector 30. Outputs A>B from the comparators 34, 35 and 36 are input to the input ends A ($2^0$), B ($2^1$), and C ($2^2$) of the 8-line decoder 37. If the Y1 output is obtained from the decoder 37, a comparison result of P1>P3>P2 is obtained. If the Y2 output is obtained from the decoder 37, a comparison result of P2>P1>P3 is obtained and so on.

Based on the comparison output from the comparator 33, the control 18-3 selects the recording units. The control program for performing this selection will now be described with reference to FIG. 12.

Figure 12:
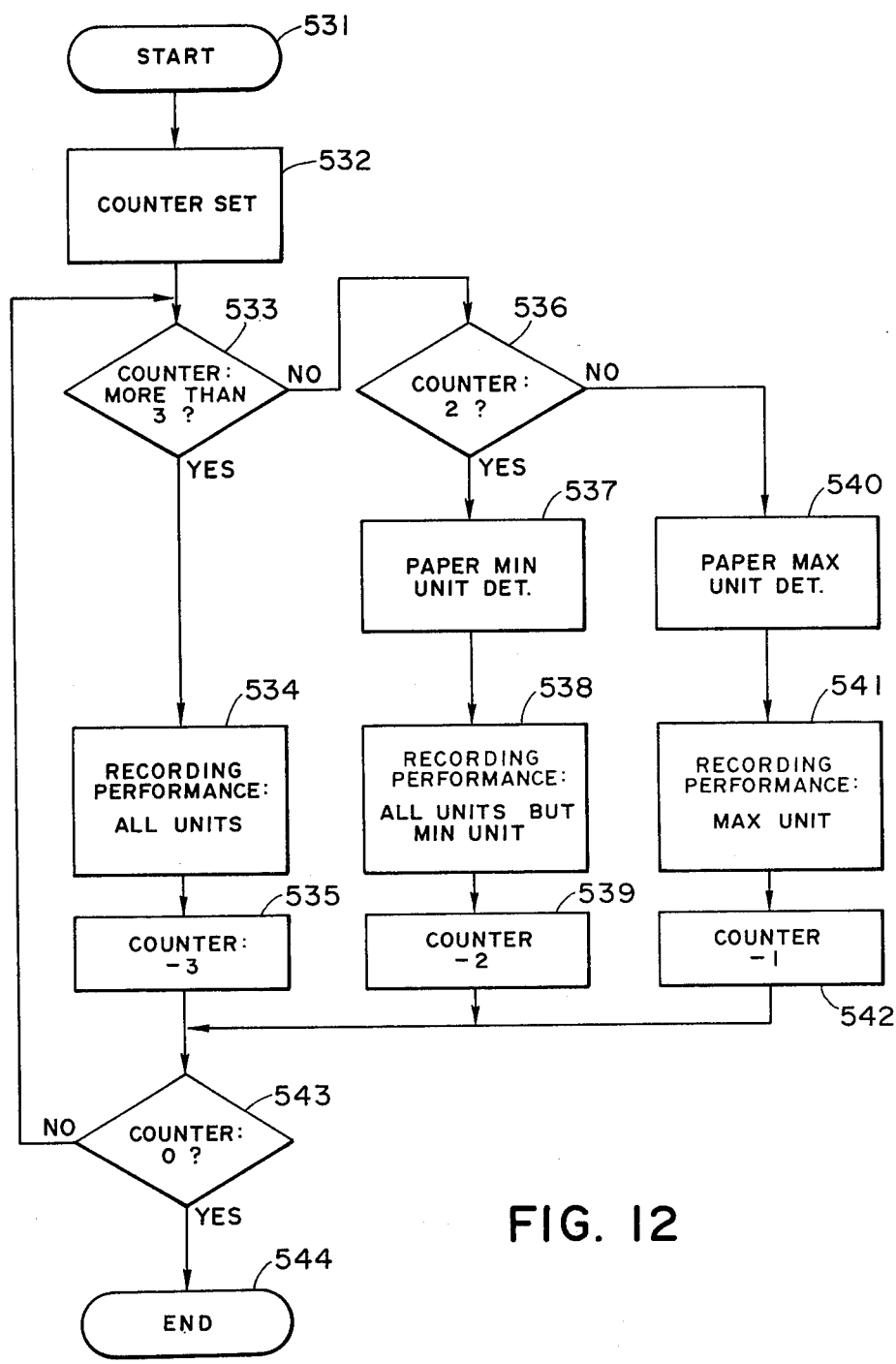
FIG. 12 is a control flow chart of the circuitry of the apparatus shown in FIG. 8.

Referring to the control program shown in FIG. 12, the recording number is set by the operation panel 19 (step 532). It is discriminated in step 533 if the content of the recording number counter is 3 or more. If it is 3 or more, recording is performed by all the recording units (step 534). After recording is completed, 3 is subtracted from the content of the recording number counter (step 535). If the content of the recording number counter is 2, the recording number with the least amount of recording paper sheets is detected (step 537). Recording is performed with the recording units excluding this recording unit (step 538). In other words, if the Y1 output is available from the decoder 37, the recording is performed by the recording units U1 and U3. If the Y2 output is available from the decoder 37, recording is performed by the recording units U1 and U2. Recording is performed with the recording units selected according to the Y3 to Y6 outputs available from the decoder 37. If the content of the recording number counter is 1, the recording unit with the greatest remaining amount of recording paper sheets is detected (step 540). Recording is performed by this recording unit (step 541). If the Y1 output is available from the decoder 37, recording is performed by the recording unit U1. If the Y2 output is available from the decoder 37, recording is performed by the recording unit U2. Recording is performed by the recording units selected according to the Y3 to Y6 output in a similar manner.

After recording, the number of the recording units which have performed recording is subtracted from the content of the recording number counter (steps 535, 539, and 542). It is then discriminated in step 543 if the content of the recording number counter is zero. Recording is terminated if the content of the recording number counter becomes zero. If the content of the recording number counter is 2, recording is performed by the two recording units which have greater remaining amounts of recording paper sheets. If the content of the recording number counter is 1, recording is performed by the recording unit which has the greatest remaining amount of recording paper sheets.

With the recording apparatus of the present invention, in order to produce the recorded copies numbering less than the number of the recording units which are capable of simultaneous recording, the remaining amounts of recording paper sheets in the cassettes corresponding to the respective recording units are detected. According to the detection results obtained, the recording units are selected in the order of greater remaining amounts of recording paper sheets. With the recording apparatus of the above construction, the recording time may be significantly reduced. In addition to this, the recording paper sheets are not exhausted more quickly in a particular cassette faster than are the other cassettes, so that supplementing of recording paper sheets need not be performed frequently.

In the embodiments described above, a plurality of recording units perform the same recording operation according to the same image information.

The recording apparatus according to the fourth embodiment of the present invention will now be described in which a plurality of recording units may perform different recording operations.

Figure 13:
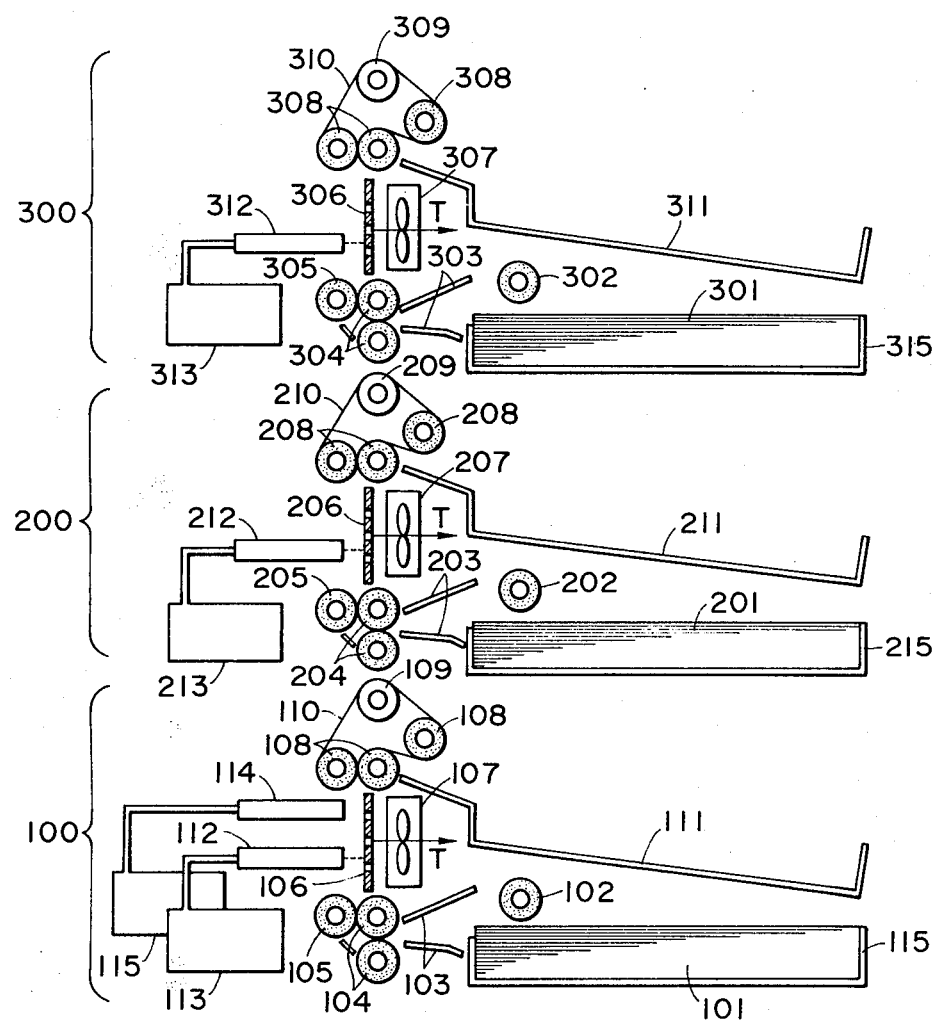
FIG. 13 is a schematic sectional view of a recording apparatus according to the fourth embodiment of the present invention.

FIG. 13 shows the recording apparatus according to the fourth embodiment of the present invention, which has the function as described above.

In FIG. 13, the same reference numerals as in FIG. 1 denote parts having simrlar functions. The embodiment in FIG. 13 differs from that shown in FIG. 1 in that the recording unit 100 has a second recording head 114 and a second ink tank 115. Therefore, the recording unit 100 has two recording heads 112 and 114 while the recording units 200 and 300 respectively have single recording heads 212 and 312.

The recording heads 112 and 114 of the recording unit 100 are for dichromatic recording. The recording head 112 is for black ink, and the recording head 114 is for red ink.

By supplying signals corresponding to black and red printing information to the recording heads 112 and 114, dichromatic recording in black and red may be performed.

The recording heads 212 and 312 of the recording units 200 and 300 record in black.

Figure 14:
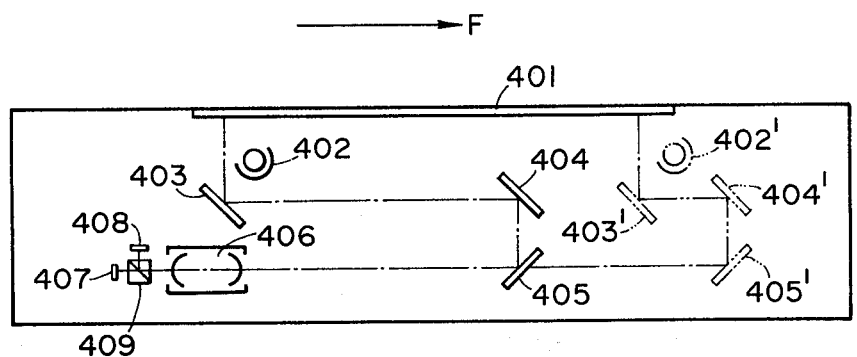
FIG. 14 is a schematic sectional view of a readout device according to a modification of the present invention.

FIG. 14 is a schematic block diagram of an original readout device of the input section for preparing printing information in the recording apparatus shown in FIG. 13.

Referring to FIG. 14, the same reference numerals as in FIG. 2 denote parts of similar functions. The device shown in FIG. 14 differs from that shown in FIG. 2 in that a beam splitter 409 is utilized for separating the light reflected by the third mirror 405 and according to its color, and CCDs 407 and 408 for receiving color-separated light from the beam splitter 409 are utilized, so that a plurality of pieces of recording information may be output.

The beam splitter 409 comprises a dichroic mirror which transmits light of the short wavelength band (blue side of the spectrum) and reflects light of the long wavelength band (red side of the spectrum) of visible light.

The two CCDs 407 and 408 are disposed symmetrically about the beam splitter 409 so as to read the same portion of the original. The direction of main scanning of the CCDs 407 and 408 is along the direction perpendicular to the plane of FIG. 14.

As in the original readout device shown in FIG. 2, the original is exposed to light and scanned by the rod-shaped light source 402, the first mirror 403, the second mirror 404, and the third mirror 405. The light reflected by the original is subjected to color separation by the beam splitter 409 and becomes incident on the CCDs 407 and 408.

Therefore, if the signals from the light-receiving elements of the CCDs 407 and 408 are read out in the right order during subscanning, signals representing different color information obtained by raster-scanning of the surface of the original may be obtained.

Figure 15:
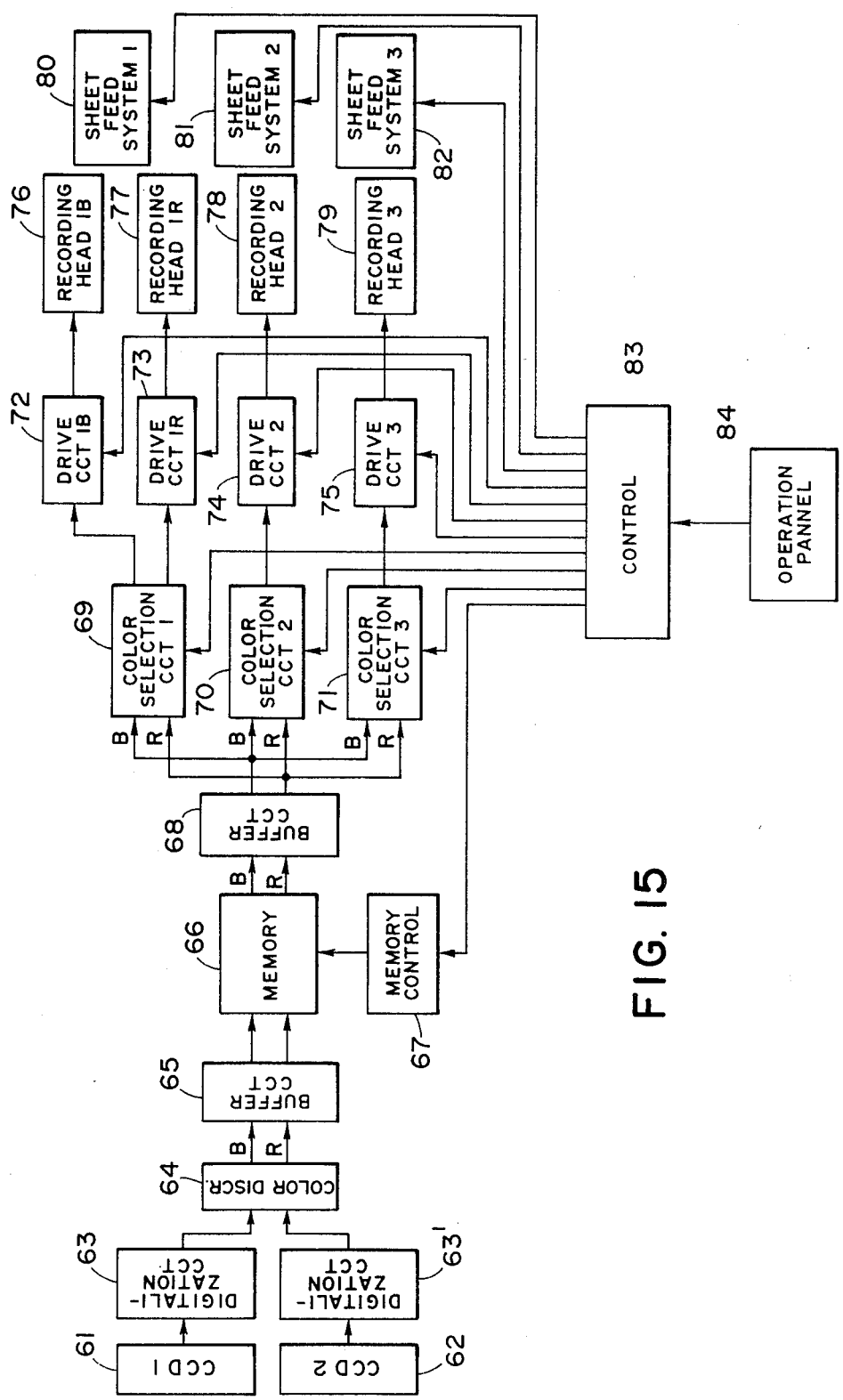
FIG. 15 is a block diagram of the control circuitry of the recording apparatus shown in FIG. 13.

FIG. 15 is a block diagram of the circuitry in the apparatus shown in FIG. 13 or 14.

A CCD1 (corresponding to the CCD 407 in FIG. 14) detects light of short wavelength band. A CCD2 (corresponding to the CCD 408 in FIG. 14) detects light of long wavelength band. Digitalization circuits 63 and 63' are connected to output ends of the CCD1 and CCD2. The digitalization circuits 63 and 63' are connected to a color discriminator 64. Two output ends of the color discriminator 64 are connected to a first buffer circuit 65. A memory 66 is capable of writing into and reading out information. A memory control 67 controls the operation of the memory 66. A second buffer circuit 68 is connected to the two output ends of the memory 66. First to third color selection circuits 69, 70 and 71 are connected to the second buffer circuit 68. Drive circuits 72 through 75 correspond to a first B recording head 76 (corresponding to the recording head 112 in FIG. 13), a first R recording head 77 (corresponding to the recording head 114 in FIG. 13), a second recording head 78 (corresponding to the recording head 212 in FIG. 13), and a third recording head 79 (corresponding to the recording head 312 in FIG. 13). A sheet feed system 80 corresponds to the first recording unit (corresponding to the recording unit 100 in FIG. 13). A sheet feed system 81 corresponds to the second recording unit (corresponding to the recording unit 200 shown in FIG. 13). A sheet feed system 82 corresponds to the third recording unit (corresponding to the recording unit 300 in FIG. 13). A control 83 controls the overall circuitry and related mechanisms. An operation panel 84 has a dial for setting a recording number, a start button for initializing recording, selection switches for selecting the recording mode of the respective recording units, and so on.

The mode of operation of the recording apparatus shown in FIG. 15 will now be described. The image data read by the CCD1 and CCD2 is binary digitalized by the digitalization circuits 63 and 63'. The binary digitalized data is color-discriminated (red and black) by the color discriminator 64.

The color discrimination is performed as shown in Table 1. The CCD1 is sensitive to white background (where, there is no image information) and nonsensitive to black and red originals since it detects light of short wavelength band. On the other hand, the CCD2 is sensitive to white background and red originals and is nonsensitive to black originals since it detects light of long wavelength band. Therefore, if the original is sensed by both the CCD1 and CCD2, the original is the white background. If the original is not sensed by either of these sensors, the original is a black original. If the original is sensed by the CCD2 but is not sensed by the CCD1, the original is a red original.

TABLE 1

|  | Black original | Red original | White background |
|---|---|---|---|
| CCD1 (short wavelength band) | Non-sensitive | Non-sensitive | Sensitive |
| CCD2 (long wavelength band) | Non-sensitive | Sensitive | Sensitive |

Figure 16:
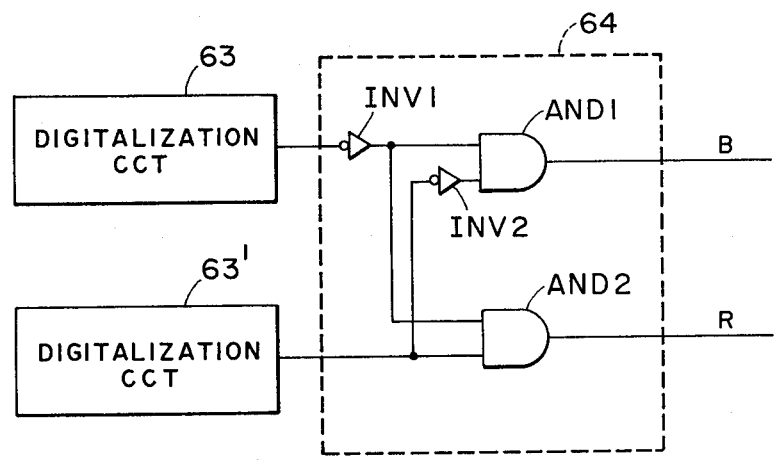
FIG. 16 is a circuit diagram of a color discrimination circuit.

The color discriminator 64 may therefore have the configuration as shown in FIG. 16. One inverter INV1 is connected to one input end of each of an AND gate AND1 and an AND gate AND2. An inverter INV2 is connected to the other input end of AND gate AND 1. The digitalization circuits 63 and 63' output signals are of high level "H" when the CCD1 and CCD2 sense light. Only when the signals output from the digitalization circuits 63 and 63' are both of low level "L", does the AND gate AND1 produce a signal of high level, a black signal B.

Only when the signal output from the digitalization circuit 63 is of low level and the signal output from the digitalization circuit 63' is of high level, can the AND gate AND2 produce a signal of high level, a red signal R.

The black signal or red signal is stored in the memory 66 comprising a RAM (random access memory) or the like through the buffer circuit 65. The capacity of the memory 66 is not particularly limited but need be more than the bit number corresponding to the gap between the recording head 112 for recording in black and the recording head 114 for recording in red of the recording unit 100 as will be described later. The memory 66 may be of a capacity comparable to a page memory.

According to the capacity of the memory 66 adopted, it is possible to record as the original is read or to read information corresponding to one or more pages into a memory and then record. It is also possible to incorporate only one CCD for readout. In this case, the output from this CCD is divided according to a plurality of threshold values for color discrimination in order to obtain a red signal R and a black signal B.

As shown in FIGS. 13 and 14, readout of the red and black information of the original is performed for the same line. However, due to dimensional limitations, the recording heads cannot record on the same line. Therefore, information must be recorded with the recording heads 112 and 114 spaced by a gap L. Therefore, the data for the recording head 114 must be delayed for the period in which the recording paper sheet is displaced by the distance L. For this purpose, a memory for storing data corresponding to this gap is required. The capacity of this memory must be (bit number of main scanning)×(line number of the gap distance L).

The address signal, the timing signal, the read/write signal, and so on for readout and writing in of data in the memory 66 are supplied by the memory control 67 which is controlled by the control 83. The image data stored in the memory 66 is output to the buffer circuit 68 under the control of the memory control 67. Black and red data stored in the buffer circuit 68 are input to a first color selection circuit 69, a second color selection circuit 70, and a third color selection circuit 71.

The first to third color selection circuits select the black signal B, the red signal R, or a logical product thereof R+B.

The signal selected by the first to third color selection circuits 69, 70 and 71 is supplied to the drive circuits 72, 73, 74 and 75 to drive the recording heads 76, 77, 78 and 79. Since the on/off operation of the drive circuits 72, 73, 74 and 75 is controlled by the control 83, the recording heads are selectively driven as needed.

The control 83 also controls the sheet feed systems 80, 81 and 82 which consist of the pickup rollers 102, 202, and 302; the register rollers 104, 204 and 304; the feed rollers 105, 205 and 305 and 108, 208 and 308, and so on.

Power is transmitted to these rollers from the same power source (not shown) through belts (not shown) and clutches (not shown). Power sources such as stepping motors may be directly connected to individual rollers.

The control 83 time-serially turns on and off the clutches for these rollers to perform the supply of the recording paper sheets described with reference to FIG. 1. As in the case of the recording heads, it is also possible to select the sheet feed systems 80 (corresponding to the recording unit 100), 81 (recording unit 200), and 82 (recording unit 300) and to record with only selected recording units.

The combinations of the recording colors and the color data of the original for recording at the first recording unit 100 (to be referred to as unit 1 hereinafter) are as in Table 2 shown below:

TABLE 2

|  | Black signal B | Red signal R |
| --- | --- | --- |
| Mode 1 | Recording in black | Recording in red |
| Mode 2 | Recording in black | Recording in black |
| Mode 3 | Recording in red | No recording |
| Mode 4 | Recording in red | Recording in red |
| Mode 5 | No recording | Recording in red |
| Mode 6 | Recording in red | Recording in black |
| Mode 7 | Recording in red | No recording |
| Mode 8 | No recording | Recording in black |

The combinations of the color data of the orginal to be recorded by the second recording unit 200 (to be referred to as unit 2 hereinafter) and the third recording unit 300 (to be referred to as unit 3 hereinafter) are as shown in Table 3 below:

TABLE 3

|  | Black signal B | Red signal R |
| --- | --- | --- |
| Mode 1 | Recording in black | Recording in black |
| Mode 2 | Recording in black | No recording |
| Mode 3 | No recording | Recording in black |

Figure 17:
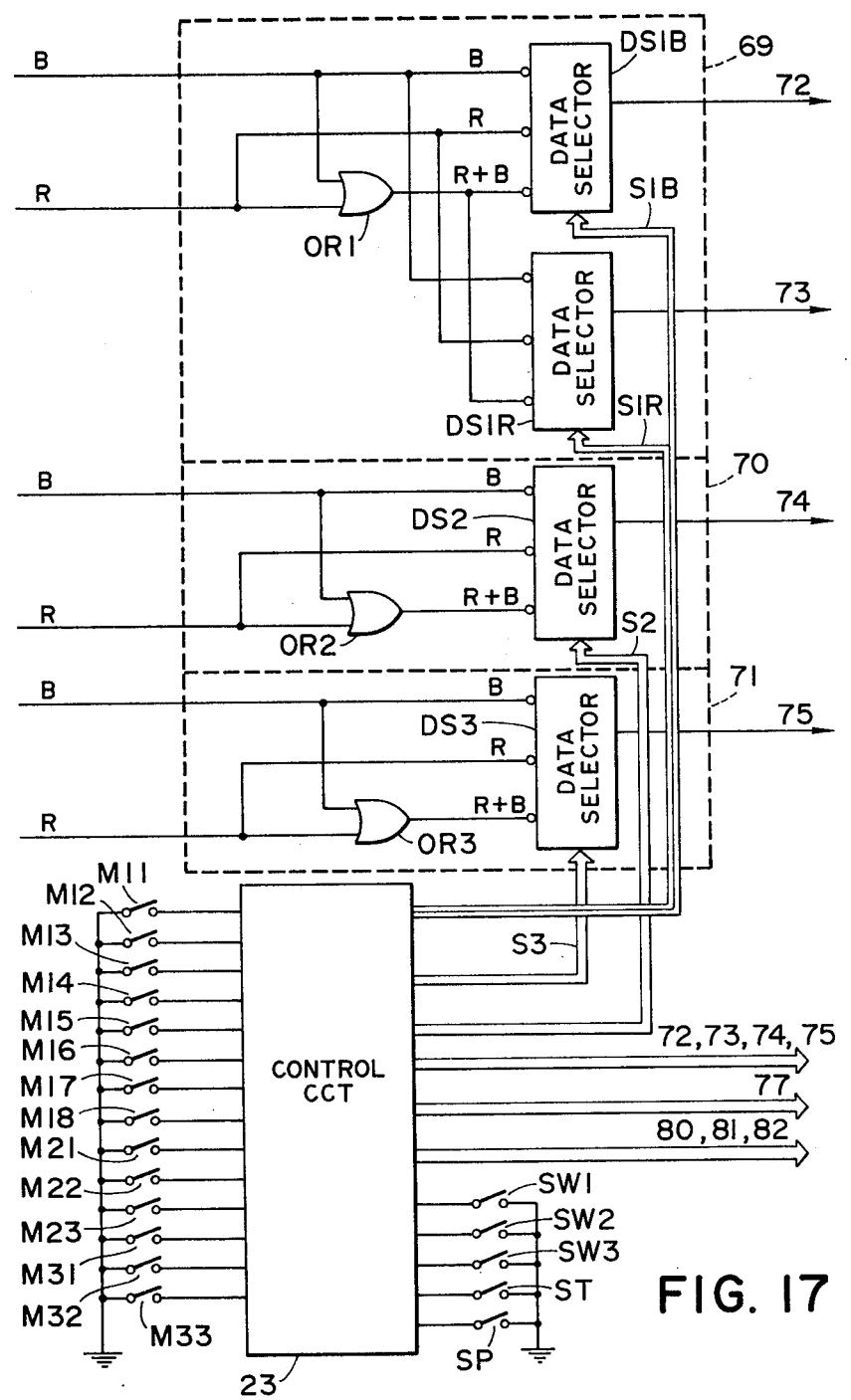
FIG. 17 is a circuit diagram of an operation panel and a color selection circuit.

FIG. 17 shows the circuit diagram of the operation panel 84, and the first to third color selection circuits.

Referring to FIG. 17, to the control 23 are connected a unit 1 selection switch SW1, a unit 2 selection switch SW2, a unit 3 selection switch SW3, a start key ST, a stop key SP, mode selection switches M11 to M18 of the unit 1, mode selection switches M31 to M33 of the unit 2, and mode selection switches of the unit 3. The output end of an OR gate OR1 is connected to a data selector DS1B. The output ends of OR gates OR2 and OR3 are connected to data selectors DS2 and DS3. The control 23 is connected to the data selectors DS1B, DS1R, DS2 and DS3 through select signal lines S1B, S1R, S2 and S3.

The black signal B and the red signal R from the buffer circuit 68 are input to the color selection circuits 69, 70 and 71 to obtain a logical sum R+B by the OR gates OR1 to OR3.

The signals B, R and R+B are input to the data selectors DS1B, DS1R, DS2 and DS3. The respective data selectors select the data signal lines by the 2-bit signal lines S1B, S1R, S2 and S3 from the control 23. When the unit 1 is selected by the switch SW1, the mode switches M11 to M18 are effective. The mode switches M11 to M18 correspond to modes 1 to 8 shown in Table 2 above. FIG. 18 shows the data selected by the data selectors DS1B and DS1R when the respective mode switches are on.

When the unit 2 is selected by the switch SW2, the mode switches M21 to M23 are effective. The mode switches M21 to M23 correspond to modes 1 to 3 shown in Table 3 above. FIG. 19 shows the data selected by the data selector DS2 when the respective mode switches are on. The similar operation is performed when the unit 3 is selected.

Two or three of switches SW1, SW2 and SW3 may be selected simultaneously. Therefore, with the combinations of the unit 1 and mode 4, and the units 2 and 3 and mode 1, a copy recorded in red (unit 1) and a copy recorded in black (unit 2) of the same data of the single original may be obtained simultaneously. This allows color differentiation of, for example, sales slips or the like and is extremly convenient. As an another example, when the unit 1 and mode 5, and the units 2 and 3 and mode 2 are selected, a copy of the black data of an original having black and red data is obtained from the units 2 and 3. A copy of the red data of the same original is simultaneously obtained from the unit 1. This allows color separation.

Accordingly, the recording apparatus of the present invention has a plurality of recording sections which simultaneously perform recording on a plurality of recording members, a recording data generating means for generating a plurality of pieces of recording data, and a data selecting means for selectively supplying the recording information to the plurality of recording units. A plurality of copies may be simultaneously obtained by the recording units. Furthermore, the same or different recording data may be recorded on the recording members, significantly improving the performance of the recording apparatus.

In the recording apparatus of the present invention, all the recording units have a first recording means for recording the recording data in a first color, and at least one recording unit has a second recording means which records in a second color which is different from the first color.

Accordingly, if all the recording units use the first recording means, a number of the same copies may be produced within a short period of time. By using the second recording means, a dichromatic copy and a monochromatic copy may be simultaneously produced. This is quite advantageous to issuance of, for example, sales slips or the like. In the embodiment described with reference to FIG. 13, only one recording unit amont the three was equipped for dichromatic recording. However, two or three recording units may have a second recording means (recording heads for dichromatic recording).

Figure 20:
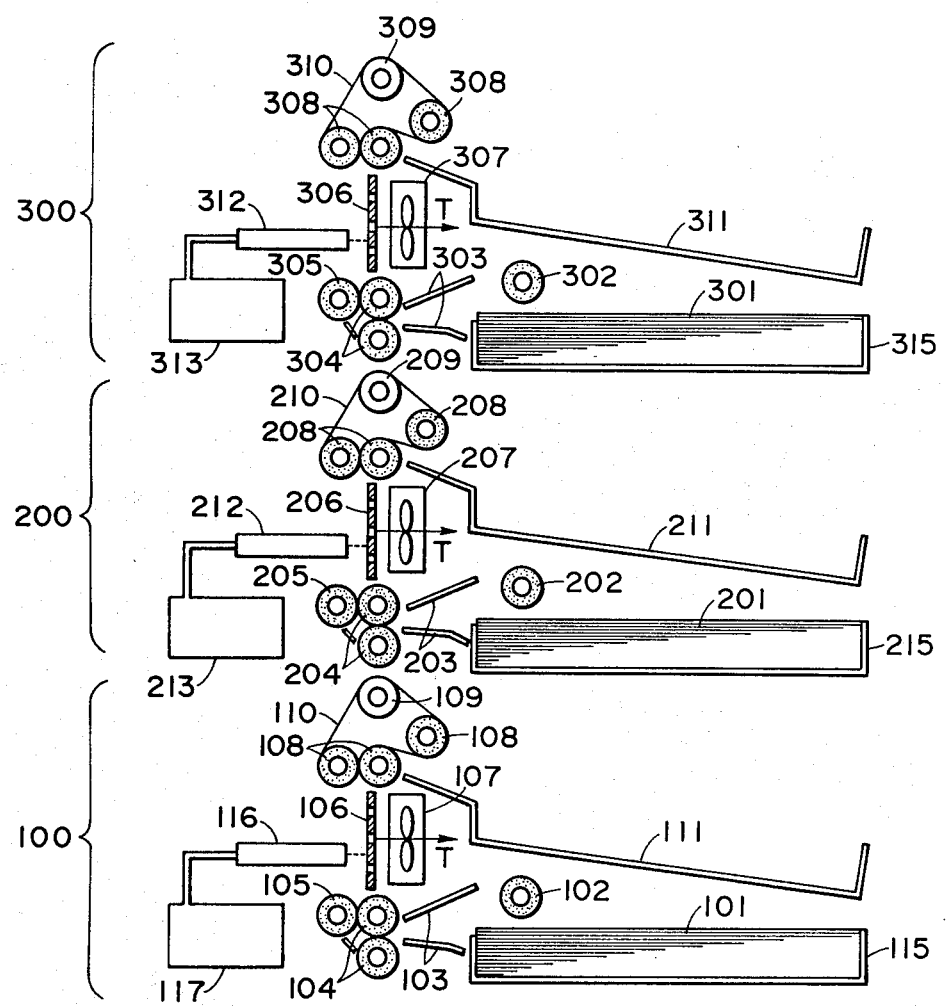
FIG. 20 is a schematic sectional view of a recording apparatus according to the fifth embodiment of the present invention.

FIG. 20 is a schematic sectional view of a recording apparatus according to the fifth embodiment of the present invention.

Referring to FIG. 13, the parts for performing the same operations or functions as those in FIG. 13 are denoted by the same reference numerals and the description thereof will be omitted. Referring to FIG. 20, an inkjet head 116 for recording in red and a red ink tank 117 are incorporated in this embodiment.

Therefore, the recording unit 100 only records in red.

Figure 21:
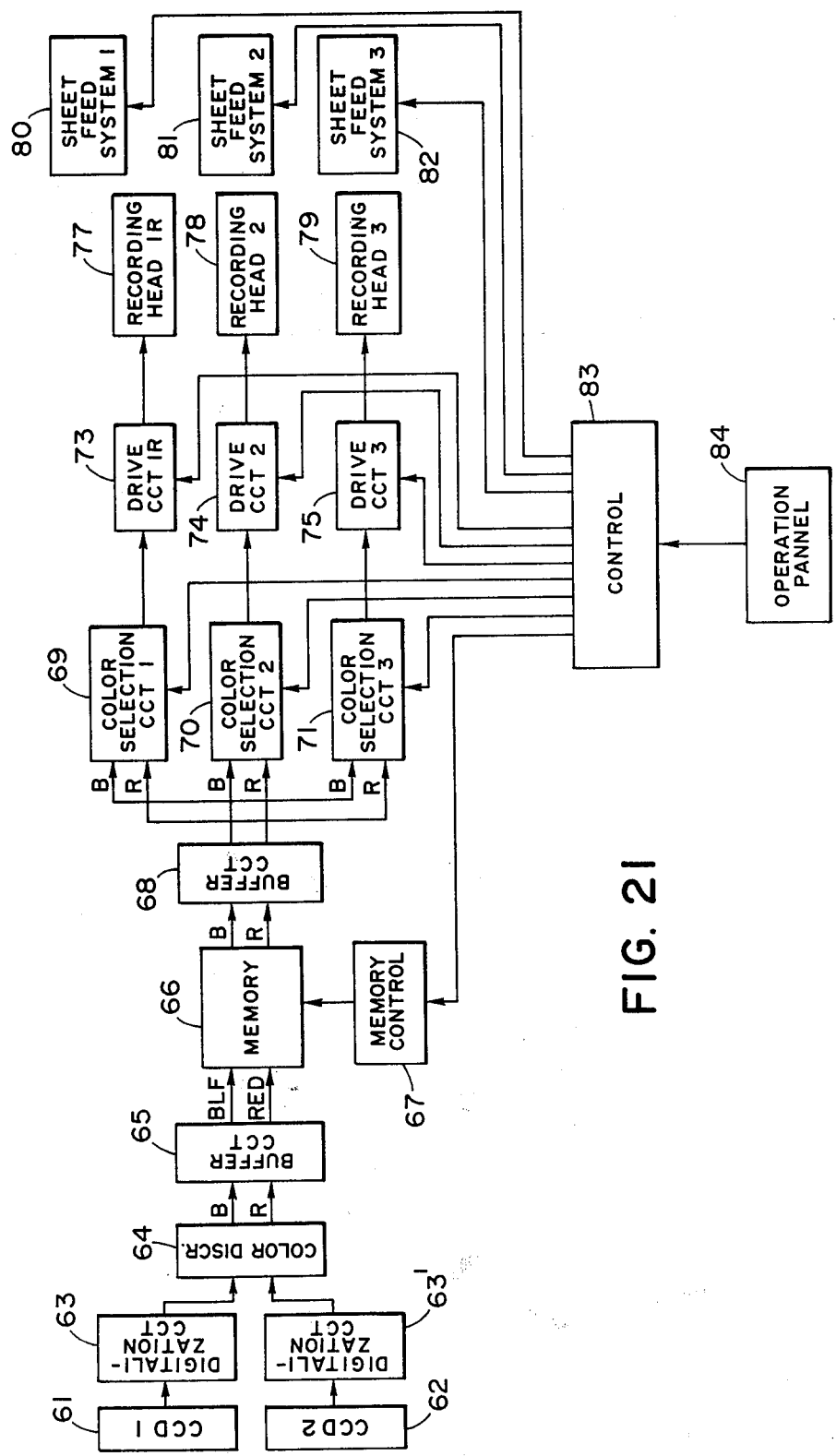
FIG. 21 is a block diagram of the control circuitry of the apparatus shown in FIG. 20.

FIG. 21 is a block diagram of a control circuitry of the recording apparatus shown in FIG. 20. The block diagram shown in FIG. 21 differs from that shown in FIG. 15 only in that the drive circuit 72 and the recording head 76 are omitted. Therefore, the description of FIG. 21 will be omitted. The first recording unit 100 is capable of selecting modes 4, 5 and 7 among the eight modes shown in Table 2.

Since the recording apparatus of the fifth embodiment allows at least two of a plurality of recording units to record in different colors, copies of different colors may be simultaneously obtained. This facilitates the issuance of the sales slips or the like.

Description has been made of cases wherein a plurality of recording units are simultaneously driven to record the same original, and the plurality of recording units are simultaneously driven to record different originals.

A case will now be described of a recording apparatus which is also capable of recording, with a plurality of recording units, the same or different data on the same recording paper sheet.

Figure 22:
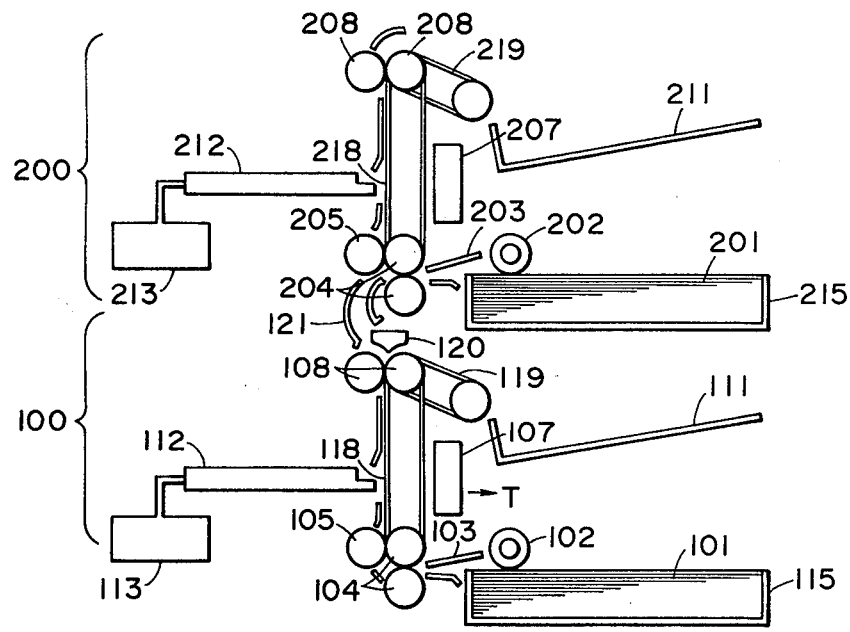
FIG. 22 is a sectional view of a recording apparatus according to the sixth embodiment of the present invention.

FIG. 22 is a schematic sectional view of a recording apparatus of this sixth embodiment.

Figure 23:
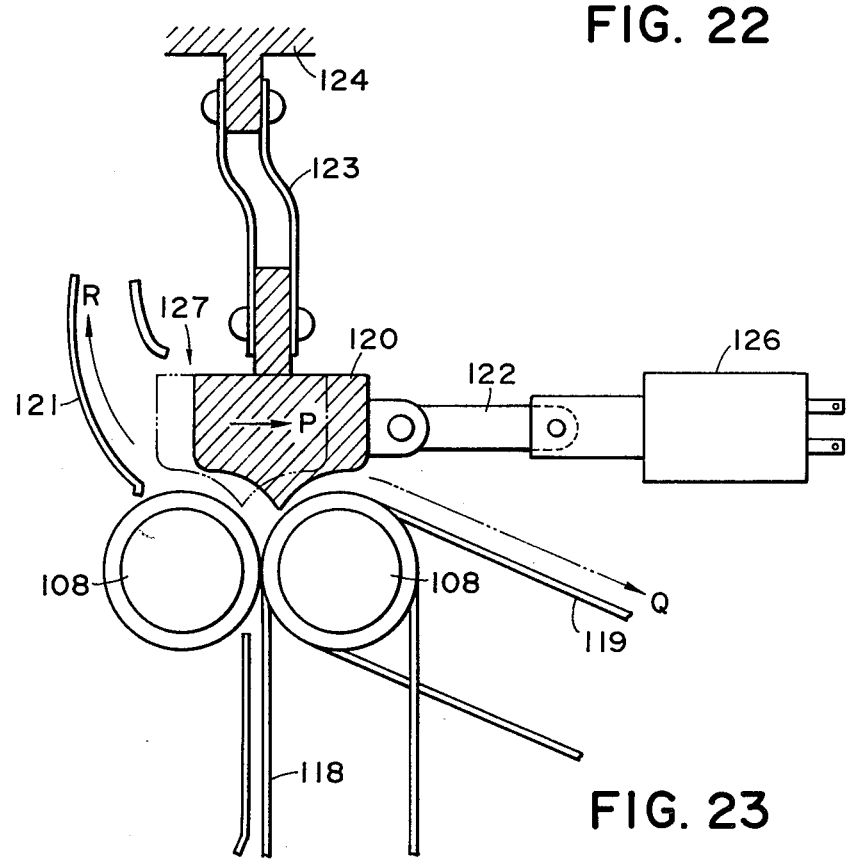
FIG. 23 is an enlarged view of a switch device for switching between the separators.

The recording apparatus shown in FIG. 22 has two recording units as in the case of other embodiments of the present invention. Parts in FIG. 22 denoted by the same reference numerals as in FIG. 1 have the same operations or functions. The recording apparatus shown in FIG. 22 differs from that shown in FIG. 1 in that the two recording units are stacked, a feed belt 118 with small holes as shown in FIG. 23 is used in place of the platen 106 shown in FIG. 1 and is disposed in the path of movement of the recording paper sheet in FIG. 1, and a feed belt 119 of the shape as shown in FIG. 23 is used in place of the feed belt to guide the recording paper sheet to the exhaust tray shown in FIG. 1. A communication guide 121 as an auxiliary feed path and a separator 120 for changing the feed path of the recording paper sheet are added in the feed path between the recording units 100 and 200.

The recording head 112 is for recording in black and the recording head 212 is for recording in red.

The mode of operation of the recording apparatus of the configuration as described above will now be described. Since the recording units 100 and 200 operate in exactly the same manner, the description will only be made on the recording unit 100.

A recording paper sheet 101 held in the recording paper sheet cassette 115 is fed to the register rollers 104 which are now stationary, upon the rotation of the pickup roller 102, and forms a suitable loop. Upon the rotation of the register rollers 104, the recording paper sheet is clamped between one register roller 104 and the first feed roller 105 to be fed toward the inkjet head 112.

The fan 107 and the feed belt 118 having small holes are disposed in opposition to the inkjet head 112. The air flow in the direction indicated by arrow T is caused by the rotation of the fan 107.

The recording paper sh whic has passed over the first feed roller 105 is drawn toward the fan 107 as it is fed to the second feed roller 108 by the feed belt 118.

As has been described above, the inkjet head 112 is an one wherein a plurality of recording elements are aligned in a length corresponding to the width of the recording paper sheet in the vertical direction in the figure. The inkjet head 112 is driven by electric signals from a signal source (not shown).

When the leading end of the recording paper sheet reaches the second feed rollers 108 after recording, the recording paper sheet is exhausted to the exhaust tray 111 by them and a feed belt 119.

FIG. 23 shows a switch device for switching the feed path of the recording paper sheets according to the present invention.

The switch device includes the feed belt 118, the second feed rollers 108, the exhaust belt 119, the separator 120, the communication guide 121, and a plunger 126. A link 122 connects the separator 120 with the plunger 126. Parallel leaf springs 124 are coupled between a box body 124 and the separator 120. When the plunger 126 is off, the parallel leaf springs 123 act to locate the separator 120 at a position indicated by alternate long and two short dashed line 127 in FIG. 23.

Under this condition, the recording paper sheet fed from below by the feed belt 118 is fed by the separator 127 to the direction Q, that is, toward the exhaust tray 111 of the first recording unit.

On the other hand, when the plunger 126 is on, the separator 120 is displaced in the direction shown by arrow P, and the recording paper sheet is fed in the direction shown by arrow R, that is, toward the second recording unit.

The inkjet heads 112 and 212 are driven by the electric signals as has been described above. For example, the inkjet heads 112 and 212 are driven by the color separation signals of the original obtained from the original readout device shown in FIG. 14.

Figure 24:
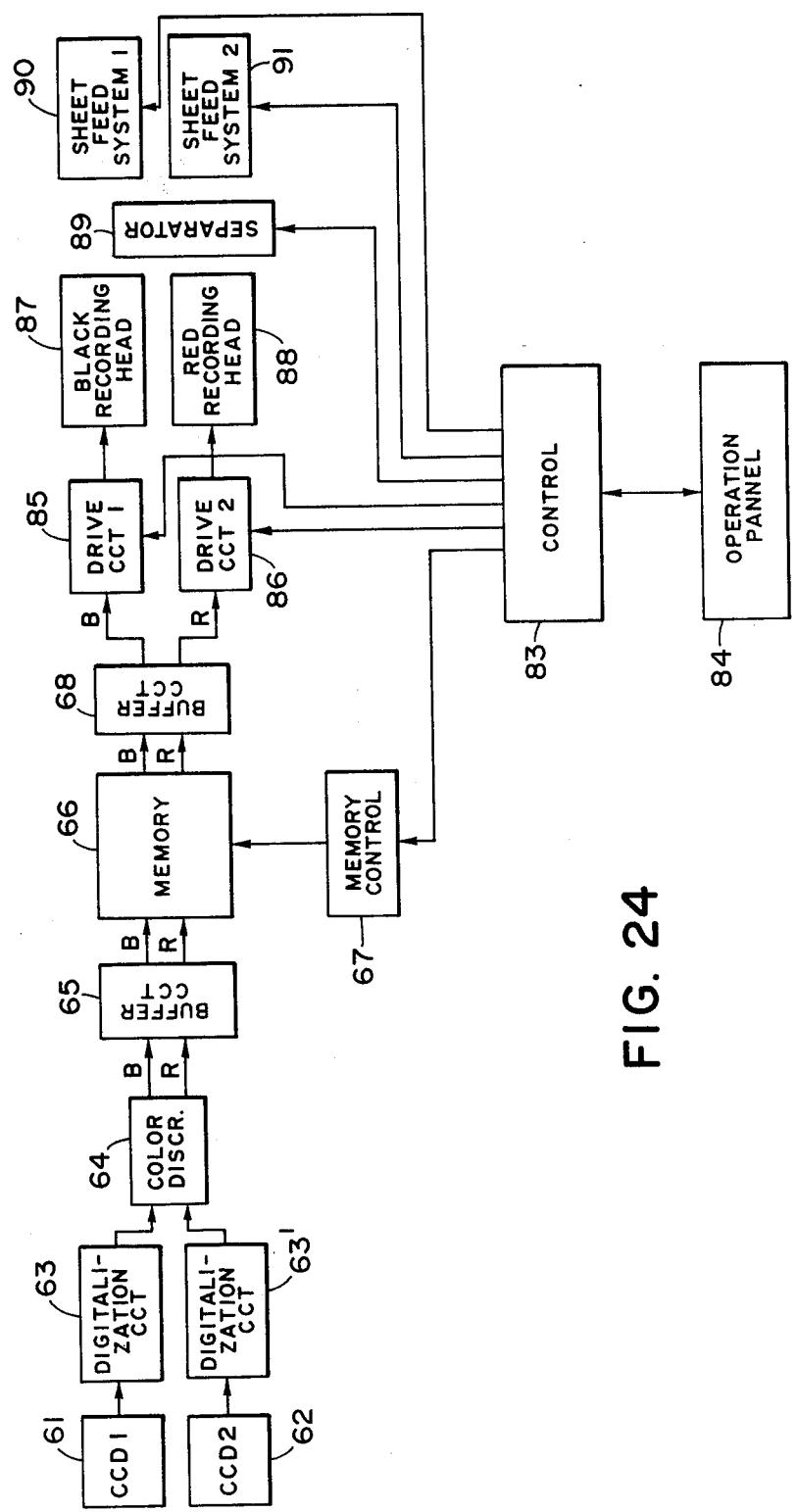
FIG. 24 is a block diagram of the control circuitry of the apparatus shown in FIG. 22.

FIG. 24 is a block diagram of the control circuitry of the recording apparatus shown in FIG. 22 or 23.

Referring to FIG. 24, the parts performing the same operations or functions as those in FIG. 15 are denoted by the same reference numerals. The analog signals from the CCD1 for detecting the light of short wavelength and the CCD2 for detecting the light of long wavelength are digitalized, color-discriminated, stored in the memory 66, and are output to the buffer circuit 68. The rest of the operation is different from that described with reference to FIG. 15.

The recording apparatus of FIG. 24 has a first drive circuit 85, a second drive circuit 86, a black recording head 87 (corresponding to the recording head 111 in FIG. 1), a red recording head 88 (corresponding to the recording head 211 in FIG. 1), a sheet feed system 90 of the first recording unit (corresponding to the recording unit 100 in FIG. 1), and a sheet feed system 91 of the second recording unit (corresponding to the recording unit 200 in FIG. 200). The control 83 also controls the overall circuitry and mechanisms. The operation panel 84 has the dial for setting the recording number, the switch for designating the copy mode such as recording in red, recording in black, recording in black and red, and recording one copy in black and another copy in red, the start button for initializing the recording, and so on.

The mode of operation of the recording apparatus shown in FIG. 24 will now be described. The image data read out by the CCD1 and CCD2 is binary-digitalized by the digitalization circuits 63 and 63'. The digitalized data is subjected to color discrimination of black or red at the color discriminator 64.

The color discrimination is performed as shown in Table 1 above as has been described hereinbefore. The CCD1 is sensitive to white background (where there is no image data) and nonsensitive to black and red originals since it detects light of the short wavelength band. On the other hand, the CCD2 is sensitive to the white background and red original and is nonsensitive to black original since it detects light of long wavelength band. Therefore, if the original is sensed by both the CCD1 and CCD2, the original is the white background. If the original is not sensed by either of these sensors, the original is a black original. If the original is sensed by the CCD2 but is not sensed by the CCD1, the original is a red original.

Black and red signals are stored in the memory 66, which comprises a RAM (random access memory), through the buffer circuit 65.

In the original readout device shown in FIG. 14, readout of the original is performed at the same line for both the red and black data. Therefore, in order to perform recording in red and black on different recording paper sheets, black data and red data may be simultaneously supplied to the heads. However, in order to record in black and red on the same recording paper sheet, after recording by the black recording head 112 is completed, the same recording paper sheet is supplied to the recording unit 200 for recording in red by the red recording head 212.

The red data to be supplied to the red recording head 212 must be delayed for the period of time required to move the recording paper sheet between the recording units. Therefore, the memory 66 has a capacity to store data for one page of the original.

The address signal, the timing signal, the read/write signal for readout and writing of the data in the memory 66 are supplied from the memory control 67 which is controlled by the control 83.

The image data stored in the memory 66 is supplied to the buffer circuit 68 under the control of the memory control 67. The black and red data of the buffer circuit 68 is transmitted to drive circuits 85 and 86 to perform recording by the recording heads 87 and 88. The on/off operation of the drive circuits 85 and 86 is controlled by the control 83, so that the recording heads are selected as needed.

The control 83 also controls the sheet feed systems 90 and 91 consisting of the pickup rollers 102 and 202, the register rollers 104 and 204, the feed rollers 105 and 205 and 108 and 208, and so on. These rollers are driven by the power transmitted from a power source (not shown) through belts (not shown) and clutches (not shown).

Power sources such as stepping motors may be directly connected to the individual motors.

The control 83 time-serially turns on and off the clutches of these rollers to feed the recording paper sheet as described with reference to FIG. 22. As in the case of the recording heads, it is possible to select the sheet feed systems 90 (corresponding to the recording 100) and 91 (corresponding to the recording unit 200) to record with the selected recording unit.

Figure 25:
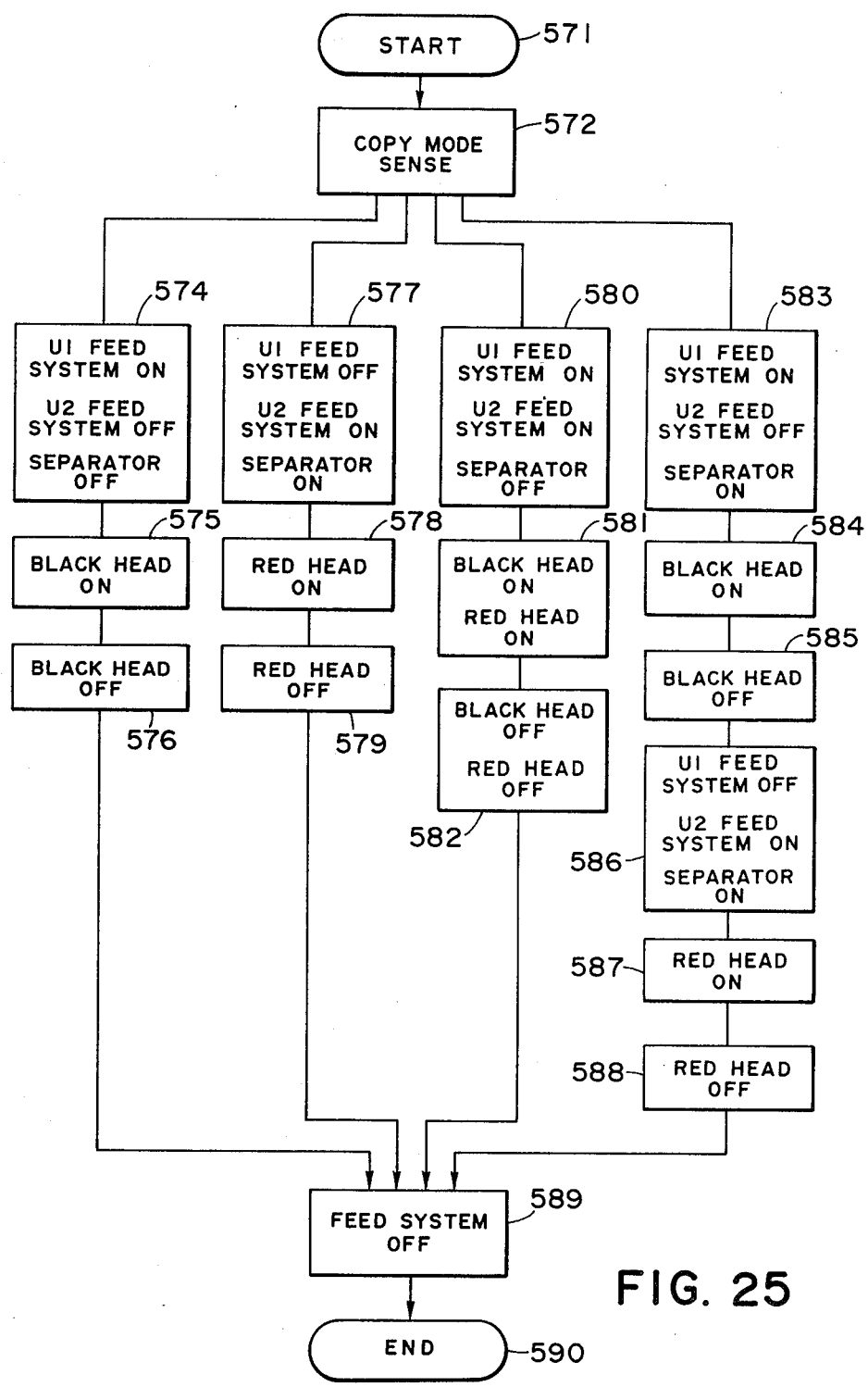
FIG. 25 is a control flow chart of the control circuit shown in FIG. 24.

FIG. 25 shows a flow chart of the control program stored in the control 83 shown in FIG. 24.

When the start button on the operation panel 84 is depressed to start recording (step 571), the copy mode selected by the copy mode switch (not shown) on the operation panel 84 is selected (step 572). The copy modes include four: the black recording mode for recording in black with the first recording unit only, the red recording mode for recording in red using the second recording unit only, a simultaneous black and red recording mode for simultaneously recording in red and black on different recording paper sheets, and the dichromatic recording mode for recording in black with the first recording unit and recording in red with the second recording unit on the same recording paper sheet.

In the black recording mode, the flow advances to step 574 in which the sheet feed system 90 of the recording unit U1 alone is driven. The separator 89 is set so that the recording paper sheet is exhausted to the exhaust tray 111 (step 574). Thereafter, the black recording head 87 is turned on at a predetermined timing (step 575), and the black recording head 87 is turned off after recording (step 576).

In the red recording mode, the flow advances to step 577 wherein the sheet feed system 91 of the second recording unit U2 alone is driven. The separator 89 is set at the same position as in the black recording mode (step 577). Thereafter, the red recording head 88 is turned on at a predetermined timing (step 578), and the red recording head 88 is turned off after recording (step 579).

In the simultaneous black and red recording, the flow advances to step 580 wherein the sheet feed systems 90 and 91 of the recording units U1 and U2 are simultaneously turned on. The separator 89 is set at the same position as in the black or red recording (step 580). The black recording head 87 and the red recording head 88 are simultaneously turned on (step 581) and are simultaneously turned off after recording (step 582).

In the dichromatic recording mode, the flow advances to step 583. First, the sheet feed system 90 of the recording unit U1 alone is turned on, and the separator 89 is set to the position at which the recording paper sheet is directed toward the recording unit U2 (step 583). Then, after a predetermined period of time, the black recording head 87 is turned on (step 584). After recording black data, the black recording head 87 is turned off (step 585). At this instant, the recording paper sheet is at the register roller 205 of the recording unit U2. Therefore, the sheet feed system 91 of the recording unit U2 excluding the pickup roller 202 is turned on. The sheet feed system 90 of the recording unit U1 is turned off. The separator 89 is held at the position at which the recording paper sheet is directed toward the recording unit U2 (step 586). After a predetermined period of time from the turning off of the sheet feed system 91, the red recording head 88 is turned on (step 587). After recording red data, the red recording head 88 is turned off (step 588).

Therefore, in the dichromatic recording mode, when the black data is recorded on the recording paper sheet at the recording unit U1, the recording paper sheet is not exhausted to the exhaust tray but is advanced to the recording unit U2 for recording in red and is then exhausted.

When the recording paper is exhausted to the exhaust trays 111 and 211 in the respective modes, the sheet feed system is turned off (step 589) to complete the recording operation (step 590).

Figure 26:
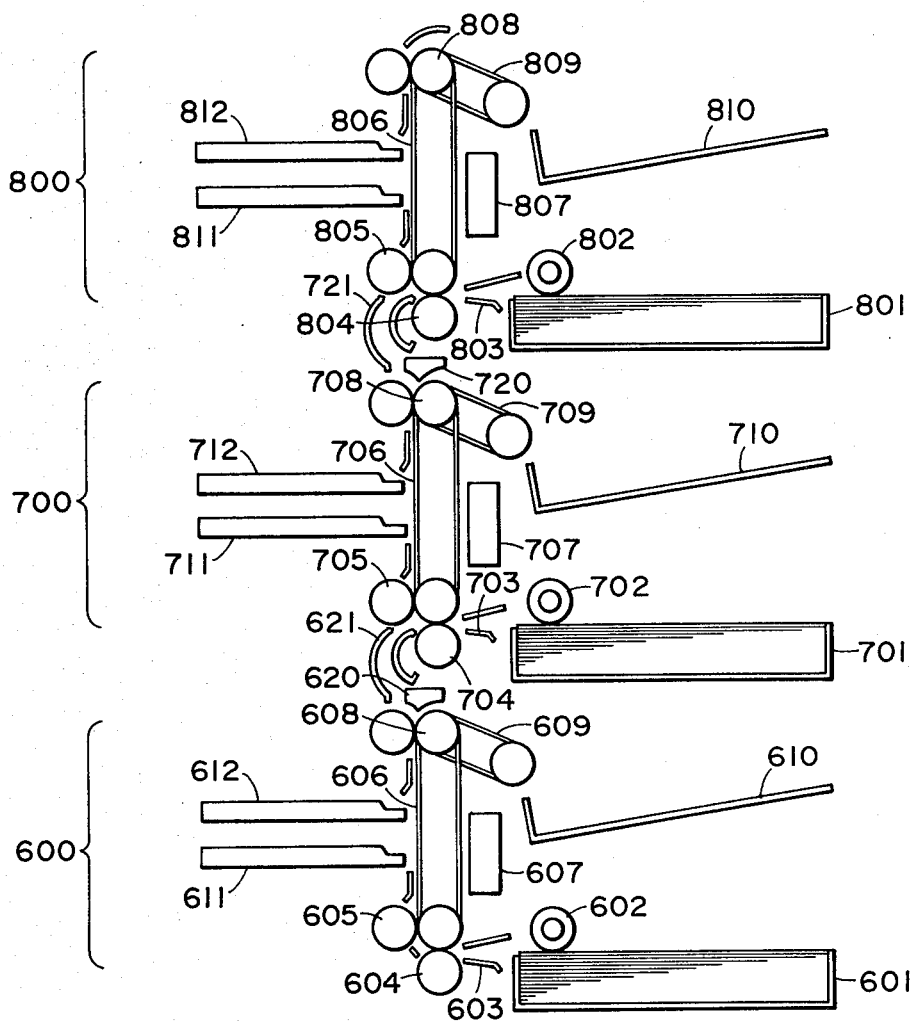
FIG. 26 is a sectional view of a recording apparatus according to the seventh embodiment of the present invention.

FIG. 26 shows the seventh embodiment of the present invention. The recording apparatus shown in FIG. 26 has three recording units 600, 700 and 800.

Referring to FIG. 26, recording paper sheets 601, 701 and 801 are picked up by pickup rollers 602, 702 and 802. The recording paper sheets are fed by guide plates 603, 703 and 803; register rollers 604, 704 and 804; first feed rollers 605, 705 and 805; and feed belts 606, 706 and 806. Fans 607, 707 and 807 are disposed to oppose inkjet heads 611, 612, 711, 712, 811 and 812. The recording paper sheets are further fed through second feed rollers 608, 708 and 808 and exhaust belts 609, 709 and 809, and exhausted to exhaust trays 610, 710 and 810. Separators 620 and 720 are incorporated for changing the feed path of the recording paper sheets. The recording apparatus also has communication guides 621 and 721.

The respective recording units 600, 700 and 800 have two recording heads. For example, the head 611 records in cyan, the head 711 records in magenta, the head 811 records in yellow, and heads 612, 712 and 812 record in black.

The separator 620 is for selection between exhaustion of the recording paper sheet to the tray 610 at the first recording unit 600 or feeding of the recording paper sheet to the second recording unit 700. The details of the separator 620 are the same as those of the separator shown in FIG. 23.

Similarly, the separator 720 is for selection between the exhaustion of the recording paper sheet to the tray 710 at the second recording unit 700 or feeding of the recording paper sheet to the third recording unit 800.

The mode of operation for recording of the recording apparatus shown in FIG. 24 is the same as that of the apparatus shown in FIG. 1. The recording units 600, 700 and 800 may be separately driven. In addition to this, the recording paper sheet may be fed through three feed paths: (1) the first recording unit, the second recording unit, and the third recording unit; (2) the first recording unit and the second recording unit; and (3) the second recording unit, and the third recording unit. Color recording in various manners may be accomplished by suitably turning on and off the heads of the respective recording units according to the feed path selected among these three feed paths.

Examples of on/off operations of the recording heads are shown in Tables 4 and 5 below.

In Table 4, the image data supplied to the heads which are on is the same. In this case, the two colors are mixed to provide recording in colors as shown in Table 4 below.

In the case of Table 5, the image data supplied to the heads which are on are different. In this case, mixing of the colors does not occur, and the colors of the selected heads are separately recorded.

Recording in colors obtained by combinations of colors in Tables 4 and 5 may also be performed by supplying different image data or the same data during recording.

For example, by combining modes 1 and 5, recording in three colors of cyan, magenta, and purple may be accomplished.

TABLE 4

|  | Mode 1 | Mode 2 | Mode 3 |
| --- | --- | --- | --- |
| First separator 620 | ON | ON | — |
| Second separator 720 | OFF | ON | ON |
| Cyan recording head 611 | ON | ON | OFF |
| Black recording head 612 | OFF | OFF | OFF |
| Magenta recording head 711 | ON | OFF | ON |
| Black recording head 712 | OFF | OFF | OFF |
| Yellow recording head 811 | OFF | ON | ON |
| Black recording head 812 | OFF | OFF | OFF |
| Recording paper sheet feed path | 1 2 | 1 2 3 | 2 3 |
| Recording color | Purple | Green | Orange |

TABLE 5

|  | Mode 4 | Mode 5 | Mode 6 | Mode 7 |
| --- | --- | --- | --- | --- |
| First separator 620 | ON | ON | ON | — |
| Second separator 720 | ON | OFF | ON | ON |
| Cyan recording head 611 | ON | ON | ON | OFF |
| Black recording head 612 | OFF | OFF | OFF | OFF |
| Magenta recording head 711 | ON | ON | OFF | ON |
| Black recording head 712 | OFF | OFF | OFF | OFF |
| Yellow recording head 811 | ON | OFF | ON | OFF |
| Black recording head 812 | ON | OFF | OFF | OFF |
| Recording paper sheet | 1 2 3 | 1 2 | 1 2 3 | 2 3 |
| Recording color | Polychromatic | Cyan + magenta | Cyan + yellow | Magenta + yellow |

Figure 27:
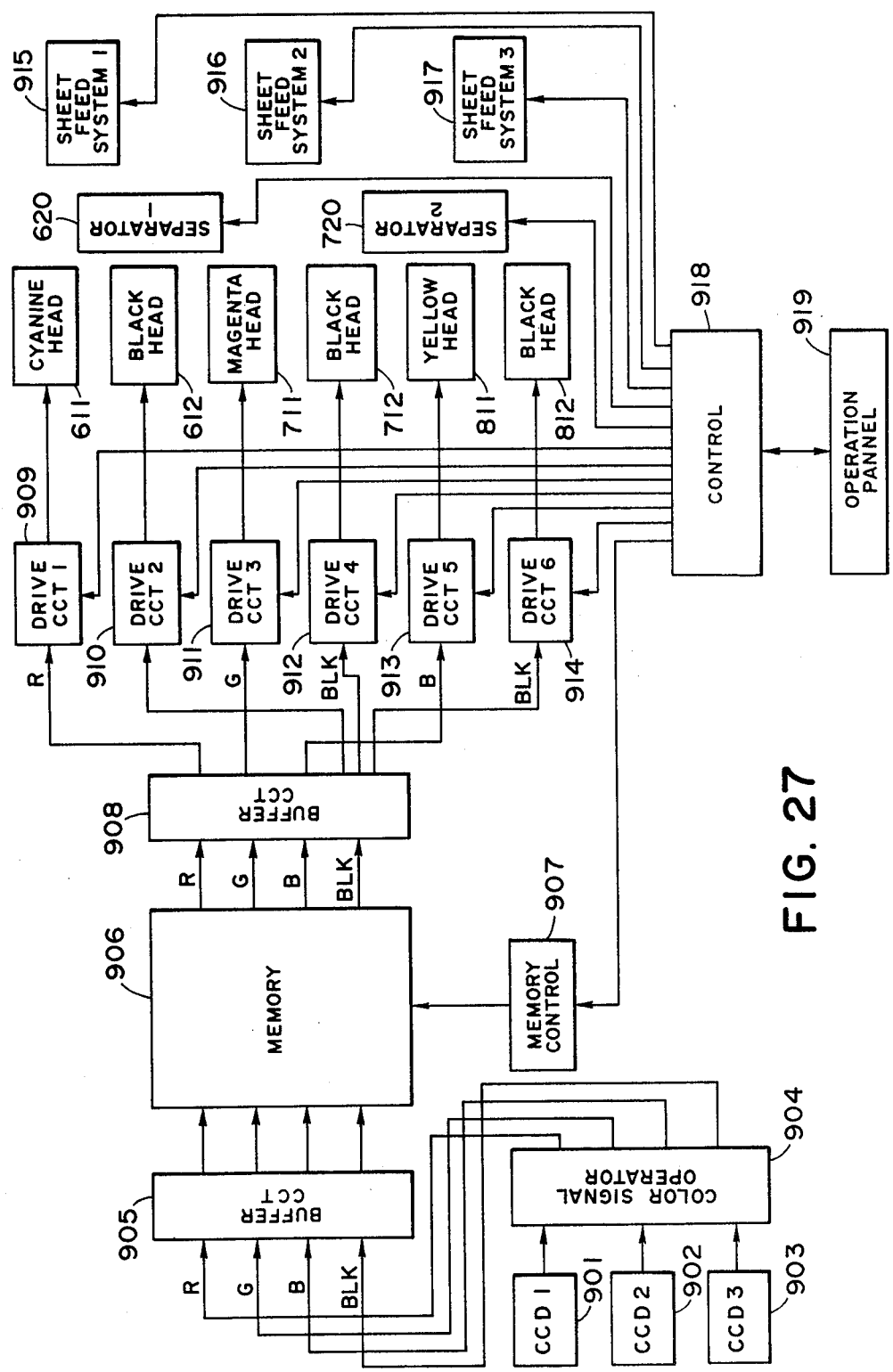
FIG. 27 is a block diagram of the control circuitry of the apparatus shown in FIG. 26.

FIG. 27 is a block diagram showing the circuitry of the apparatus shown in FIG. 26.

Referring to FIG. 27, a CCD1 901, a CCD2 902, and a CCD3 903 are connected to a color signal operator 904 which is in turn connected to a first buffer circuit 905. A memory 906 is capable of readout and writing of data. A memory control 907 controls the memory 906. A second buffer circuit 908 is connected to the memory 906. The second buffer circuit 908 is connected to a cyan recording head 611, a magenta recording head 711, a yellow recording head 811, and black recording heads 612, 712 and 812 through drive circuits 909, 910, 911, 912, 913 and 914, respectively. A control 918 controls these drive circuits and heads as well as first and second separators 620 and 720. The control 918 also controls a first sheet feed system 915 of the first recording unit, a second sheet feed system 916 of the second recording unit, and a third sheet feed system 917 of the third recording unit. An operation panel 919 has a dial for setting the recording number, a switch for specifying the copy mode, a start button for initiating the recording operation and so on.

The mode of operation of the circuitry shown in FIG. 27 will now be described. Light transmitted through a red filter is incident on the CCD1 901. Light transmitted through a green filter is incident on the CCD2 902. Light transmitted through a blue filter is incident on the CCD3 903. The image data read by the respective CCDs is colorseparated by the color signal operator 904 into a red signal R, a green signal G, a blue signal B, and a black signal BLK. These signals are stored in the memory 906 comprising a RAM (random access memory).

The memory 906 is a page memory having a capacity to store data corresponding to one page of the original. The page memories are incorporated in correspondence with four colors.

The address signal, the timing signal, the read/write signal for readout and writing of the data in the memory 906 are supplied from the memory control 907.

The image data stored in the memory 906 is output to the buffer circuit 908 under the control of the memory control 907.

The red signal R is supplied to the first drive circuit 909 of the cyan recording head 611. The green signal G is supplied to the third drive circuit 910 of the magenta recording head 711. The blue signal B is supplied to the fifth drive circuit 5 of the yellow recording head 811. The black signal BLK is supplied to the second drive circuit 910, the fourth drive circuit 912, and the sixth drive circuit 914 of the black recording heads 612, 712 and 812. Since the on/off operation of the drive circuits 909 to 914 is controlled by the control 918, the Z0 recording heads are selected as needed.

The control 918 controls the on/off operation of the first separator 620 and the second separator 720 as well as the sheet feed systems 915, 916 and 917 consisting of pickup rollers 602, 702 and 802; the register rollers 604, 704 and 804; the first feed rollers 605, 705 and 805; the feed belts 606, 706 and 806; and the second feed rollers 608, 708 and 808.

The copy modes as shown in Tables 4 and 5 may be established by suitably controlling the separators 620 and 720 and the sheet feed systems 915, 916 and 917.

With the recording apparatus of the configuration described above, the monochromatic recording in cyan, magenta, yellow, green, purple, orange and black; dechromatic recording in cyan and magenta, magenta and yellow, yellow and cyan, black and any other color; and polychromatic recording may be accomplished by switching the separators.

The recording apparatus of the present invention has a first recording unit for recording first image data on a recording medium, a second recording unit for recording second image data on a recording medium; first and second main sheet feed paths which are incorporated in correspondence with the first and second feed recording units and which guide the recording medium to the first and second recording units and exhaust after recording, and an auxiliary feed path for guiding the recording medium to the main first feed path in order to guide it after recording at the first recording unit to the second recording unit. Therefore, the first and second image data may be simultaneously recorded on the separate recording media or on the single recording medium, significantly improving the recording performance.

The recording apparatus of the present invention has a plurality of recording units for recording an image in different colors, main feed paths for feeding the recording medium to the plurality of recording units and exhausting after recording, an auxiliary feed path which connects between the main feed paths for feeding the recording medium after recording at any recording unit to another recording unit, and a feed path switching means for guiding the recording medium from the main feed path to the auxiliary feed path.

With the recording apparatus of the above configuration, monochromatic recording, dichromatic recording and polychromatic recording may be performed with ease. Furthermore, monochromatic copies of different colors may be simultaneously made, so that issuance of the sales slips or the like may be facilitated.

By feeding a plurality of different pieces of data to the plurality of recording units, and repeating recording on the single recording medium according to the data, synthesis of the image data is also possible.

In the embodiments described above, the inkjet recording was adapted as the recording means. Although inkjet heads are advantageous for compact apparatuses, the present invention is not particularly limited to this and may be extended to thermal printing or electrostatic printing or the like.

In the embodiments described above, the original image read by the solid pickup elements is used as the recording image for the recording apparatus. However, the recording image may be characters, figures and so on generated by character generators or the like.

What we claim is:

1. An image recording system comprising:
   a plurality of recording units for recording on a plurality of recording media;
   means for setting a recording number; and
   means for selecting at least one of said recording units to be used for recording, accodding to the recording number set by said recording number setting means.

2. A system according to claim 1, wherein said plurality of recording units are operable to record simultaneously on a plurality of recording media.

3. A system according to claim 1, wherein said plurality of recording units are operable to record the same image data.

4. A system according to claim 1, wherein said recording unit selecting means selects all of said recording units when the recording number set in said recording number setting means is greater than the number of said recording units.

5. A system according to claim 1, wherein said recording units are selected according to a predetermined priority when the recording number set in said recording number setting means is smaller than the total number of said recording units.

6. An image recording system comprising:
   a plurality of recording units for recording on a plurality of recording media;
   a plurality of holders each associated with one of said plurality of recording units for holding said recording media; and
   means for selecting at least one of said recording units for recording;
   said recording units being selected for recording by said selecting means according to a predetermined priority, and the capacities of said holders being set according to said priority.

7. A system according to claim 6, wherein said plurality of recording units are operable to record simultaneously on a plurality of recording media.

8. A system according to claim 6, wherein said plurality of recording units are operable to record the same image data.

9. An image recording system comprising:
   a plurality of recording units for recording on a plurality of recording media;
   means for setting a recording number;
   means for detecting if each of said recording units is in a usable condition; and
   means for selecting at least one of said recording units to be used for recording according to an output from said detecting means, said selected recording unit or units performing recording a number of times equal to the number set by said setting means.

10. A system according to claim 9, wherein said recording unit selecting means selects at least one of said recording units to be used by comparing the number of said recording units which are in unsable condition and the recording number set in said setting means.

11. An image recording system comprising:
    a plurality of recording units for recording on a plurality of recording media;
    a plurality of holders each associated with one said recording unit for holding said recording media;
    means for detecting the amount of said recording media held in each of said holders; and
    means for selecting at least one said recording unit to be used for recording according to an output from said detecting means.

12. A system according to claim 11, wherein said recording unit selecting means selects, according to a priority, said recording unit with which said holder, holding the greatest amount of said recording media, is associated.

13. A system according to claim 11, wherein said recording unit selecting means selects all of said recording units independently of the output from said detecting means when the recording number is greater than the total number of said recording units.

14. An image recording system comprising:
a plurality of recording units for recording on a plurality of recording media;
means for generating a plurality of pieces of recording data; and
data selecting means for selectively supplying said plurality of pieces of data to said plurality of recording units, said data selecting means further selecting data from said plurality of pieces of recording data, and selecting at least one of said recording units to which the selected data is supplied.

15. A system according to claim 14, wherein said plurality of pieces of recording data are obtained by color separation of an image of an original and contain different color data.

16. A system according to claim 14, wherein said data selecting means selectively supplies one or a combination of a plurality of pieces of data to said recording unit or units selected thereby.

17. A system according to claim 14, wherein said plurality of recording units is operable to record simultaneously on a plurality of recording media.

18. An image recording system comprising:
a plurality of recording units for recording on a plurality of recording media; and
means for generating recording data to be recorded by said recording units;
each of said plurality of recording units having first recording measn for recording said data in a first color, and a least one of said recording units having second recording means for recording said data in a second color.

19. A system according to claim 18, wherein said first recording means and said second recording means are operable both independently of each other and simultaneously.

20. A system according to claim 18, wherein a recording color for each of said plurality of recording units can be selected.

21. A system according to claim 18, wherein said first recording means performs image recording in black color.

22. An image recording system comprising:
a plurality of recording units for recording on a plurality of recording media; and
means for generating recording data for said recording units;
at least one of said recording units being operable to record said recording data generated by said generating means in a different color from the colors in which other recording units record.

23. An image recording system according to claim 22, wherein said plurality of recording units are operable to record simultaneously on a plurality of recording media.

24. An image recording system comprising:
a first recording unit for recording first image data on a recording medium;
a second recording unit for recording second image data on another recording medium;
first and second main feeding means, each associated with one of said recording units, respectively for feeding said recording medium and said other recording medium to said first and second recording units and exhausting said respective recording media after recording; and
auxiliary feeding means for feeding said recording medium to said second recording unit after recording thereon by said first recording unit.

25. A system according to claim 24, wherein said first recording unit and said second recording unit record in different colors.

26. A system according to claim 24, wherein said auxiliary feeding means comprises switching means for guiding said recording medium from said first main feeding means to said second main feeding means and alternatively for causing said recording medium to be fed only by said first main feeding means and said other recording medium to be fed only by said second main feeding means.

27. A system according to claim 25, wherein said first recording unit and said second recording unit each have holders respectively for holding said recording medium and said other recording medium and exhausting members respectively for receiving said recording medium and said other recording medium after recording.

28. An image recording system comprising:
means for electrically reading an image of an original and generating an output signal representative thereof;
means for operating on an output signal from said reading means to generate a plurality of image signals representing different color data;
means for recording color images based on said plurality of image signals from said operating means; and
selecting means for selectively supplying said plurality of image signals to said recording means.

29. A system according to claim 28, wherein said electrical reading means has a first detection element for detecting light of short wavelength and a second detection element for detection light of long wavelength.

30. A system according to claim 28, wherein said operating means generates a plurality of image signals representing different color data.

31. A system according to claim 28, wherein said electrical reading means reads the image of said original and discriminates between two colors comprising the image.

32. A system according to claim 28, wherein said recording means records an image, based on said plurality image signals, in black or red color.

33. An image recording system comprising:
a plurality of recording units for recording on a plurality of recording members; and
means for selecting at least one of said recording units according to a predetermined priority;
said plurality of recording units each accommodating a recording agent for image recording on the recording member in an amount corresponding to said priority.

34. A system according to claim 33, wherein said recording units are each provided with a vessel having capacity sufficient to accommodate the amount of the recording agent.

35. A system according to claim 33 wherein said selecting means selects one or more of said recording units in accordance with the number recordings to be made by said system.

36. An image recording system comprising:
means for electrically reading an image of an original;

means for converting image information representing the image read by said reading means to a digital signal;

a plurality of recording units for recording an image based on the digital signal from said converting means; and means for selecting a number of said plurality of recording units to be enabled for image recording;

said selected number of recording units being simultaneously operable for image recording.

37. A system according to claim 36, including means for setting the recording number to be recorded by said recording units.

38. A system according to claim 36, including means for detecting an abnormality in any one of said recording units.

39. An image recording system comprising:

means for electrically reading an image of an original;

means for storing data representing the image read by said reading means; and a plurality of recording units each for recording an image based on the same image data from said storage means.

40. A system according to claim 39 wherein each of said plurality of recording units records the image in a different color from others of said recording units.

* * * * *

UNITED STATES PATENT AND TRADEMARK OFFICE
CERTIFICATE OF CORRECTION

PATENT NO. : 4,476,486

DATED : October 9, 1984

INVENTOR(S) : NAOKI AYATA, ET AL.

It is certified that error appears in the above-identified patent and that said Letters Patent is hereby corrected as shown below:

Col. 1, line 31, between "if" and "is" insert --it--.

Col. 5, line 27, change "is" to --are--;

line 29, change "is" to --are--.

Col. 12, line 7, change "simrlar" to --similar--.

Col. 13, line 34, between "where" and "there" delete " , ".

Col. 15, line 42, change "M31 to M33" to --M21 to M23--;

line 43, between "switches" and "of" insert

--M31 to M33--.

Col. 16, line 10, delete "an";

line 43, change "amont" to --among--.

Col. 17, line 49, change "sh whic" to --sheet which--;

line 52, delete "an".

Col. 18, line 1, change "springs 124" to --springs 123--;

line 40, change "200" (second occurrence) to --1--.

Col. 21, line 29, change "is" to --are--.

UNITED STATES PATENT AND TRADEMARK OFFICE
CERTIFICATE OF CORRECTION

PATENT NO. : 4,476,486

DATED : October 9, 1984

INVENTOR(S) : NAOKI AYATA, ET AL.

It is certified that error appears in the above-identified patent and that said Letters Patent is hereby corrected as shown below:

Col. 22, line 40, change "colorseparated" to

--color-separated--;

line 64, delete "ZO".

Col. 23, lines 10-11, change "dechromatic" to --dichromatic--;

line 68, change "accodding" to --according--.

Col. 25, line 34, change "measn" to --means--.

Col. 26, line 39, change "detection" to --detecting--.

Signed and Sealed this

Thirteenth Day of August 1985

[SEAL]

Attest:

DONALD J. QUIGG

Attesting Officer   Acting Commissioner of Patents and Trademarks